United States Patent [19]
Shwed et al.

[11] Patent Number: 5,835,726
[45] Date of Patent: *Nov. 10, 1998

[54] SYSTEM FOR SECURING THE FLOW OF AND SELECTIVELY MODIFYING PACKETS IN A COMPUTER NETWORK

[75] Inventors: Gil Shwed; Shlomo Kramer, both of Tel Aviv; Nir Zuk, Ramat Gan; Gil Dogon, Herzlia; Ehud Ben-Reuven, Tel Aviv, all of Israel

[73] Assignee: Check Point Software Technologies Ltd., Ramat Gan, Israel

[ * ] Notice: The term of this patent shall not extend beyond the expiration date of Pat. No. 5,606,668.

[21] Appl. No.: 664,839

[22] Filed: Jun. 17, 1996

Related U.S. Application Data

[63] Continuation-in-part of Ser. No. 168,041, Dec. 15, 1993, Pat. No. 5,606,668.

[30] Foreign Application Priority Data

Jun. 15, 1995 [IL] Israel ......................................... 114182

[51] Int. Cl.⁶ ........................... G06F 13/36; G06F 15/401
[52] U.S. Cl. ........................ 395/200.59; 395/187.01; 395/186; 395/200.77
[58] Field of Search ......................... 395/200.76, 200.77, 395/200.79, 200.34, 200.56, 186, 187.01, 200.57, 200.59

[56] References Cited

U.S. PATENT DOCUMENTS

| | | | |
|---|---|---|---|
| 4,315,315 | 2/1982 | Kossiakoff | 364/300 |
| 4,736,320 | 4/1988 | Bristol | 364/300 |

(List continued on next page.)

OTHER PUBLICATIONS

Ranum M.J. "A Network Firewall" Digital Equipment Corp.
Chapman, D.D. "Network (in) Security . . . " Proceedings of the 3 UNSENIX UNIX Security Symposium; Baltimore, MD, Sep. 1992.

Safford, D.R. et al. "The TAMU Security Package . . . " Unix Security Symposium IV, Oct. 4–6, 1993.

Cheswick, B. "The Design of a Secure Internet . . . " AT&T Bell Laboratory, Jun. 1990.

Schauer, H. "An Internet Gate Keeper", Herve Schauer Consultants.

Primary Examiner—Frank J. Asta
Assistant Examiner—Daniel Patru
Attorney, Agent, or Firm—Ladas & Parry

[57] ABSTRACT

The present invention discloses a novel system for controlling the inbound and outbound data packet flow in a computer network. By controlling the packet flow in a computer network, private networks can be secured from outside attacks in addition to controlling the flow of packets from within the private network to the outside world. A user generates a rule base which is then converted into a set of filter language instruction. Each rule in the rule base includes a source, destination, service, whether to accept or reject the packet and whether to log the event. The set of filter language instructions are installed and execute on inspection engines which are placed on computers acting as firewalls. The firewalls are positioned in the computer network such that all traffic to and from the network to be protected is forced to pass through the firewall. Thus, packets are filtered as they flow into and out of the network in accordance with the rules comprising the rule base. The inspection engine acts as a virtual packet filtering machine which determines on a packet by packet basis whether to reject or accept a packet. If a packet is rejected, it is dropped. If it is accepted, the packet may then be modified. Modification may include encryption, decryption, signature generation, signature verification or address translation. All modifications are performed in accordance with the contents of the rule base. The present invention provides additional security to a computer network by encrypting communications between two firewalls between a client and a firewall. This permits the use of insecure public networks in constructing a WAN that includes both private and public network segments, thus forming a virtual private network.

25 Claims, 23 Drawing Sheets

U.S. PATENT DOCUMENTS

| | | |
|---|---|---|
| 5,241,599 | 8/1993 | Bellovin et al. . |
| 5,247,693 | 9/1993 | Bristol .................................. 395/800 |
| 5,329,623 | 7/1994 | Smith et al. ........................... 395/275 |
| 5,442,708 | 8/1995 | Adams, Jr. et al. . |
| 5,444,782 | 8/1995 | Adams, Jr. et al. . |
| 5,473,607 | 12/1995 | Hausman et al. ..................... 370/85 |
| 5,485,455 | 1/1996 | Dobbins et al. ...................... 370/60 |
| 5,515,376 | 5/1996 | Murthy et al. ....................... 370/85.13 |
| 5,555,346 | 9/1996 | Gross et al. .......................... 395/51 |
| 5,606,668 | 2/1997 | Shwed .................................. 395/187.01 |

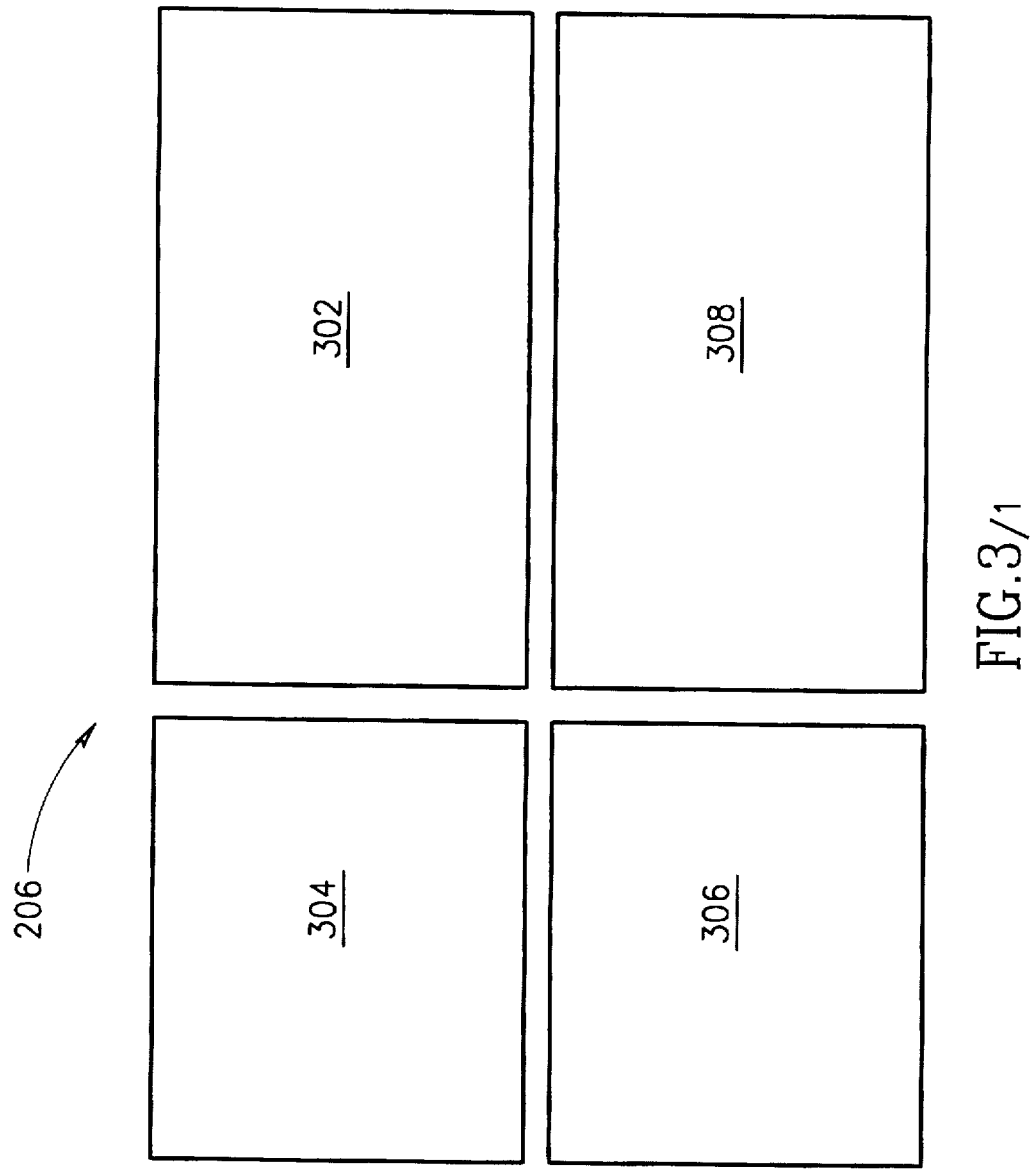
FIG.3/1

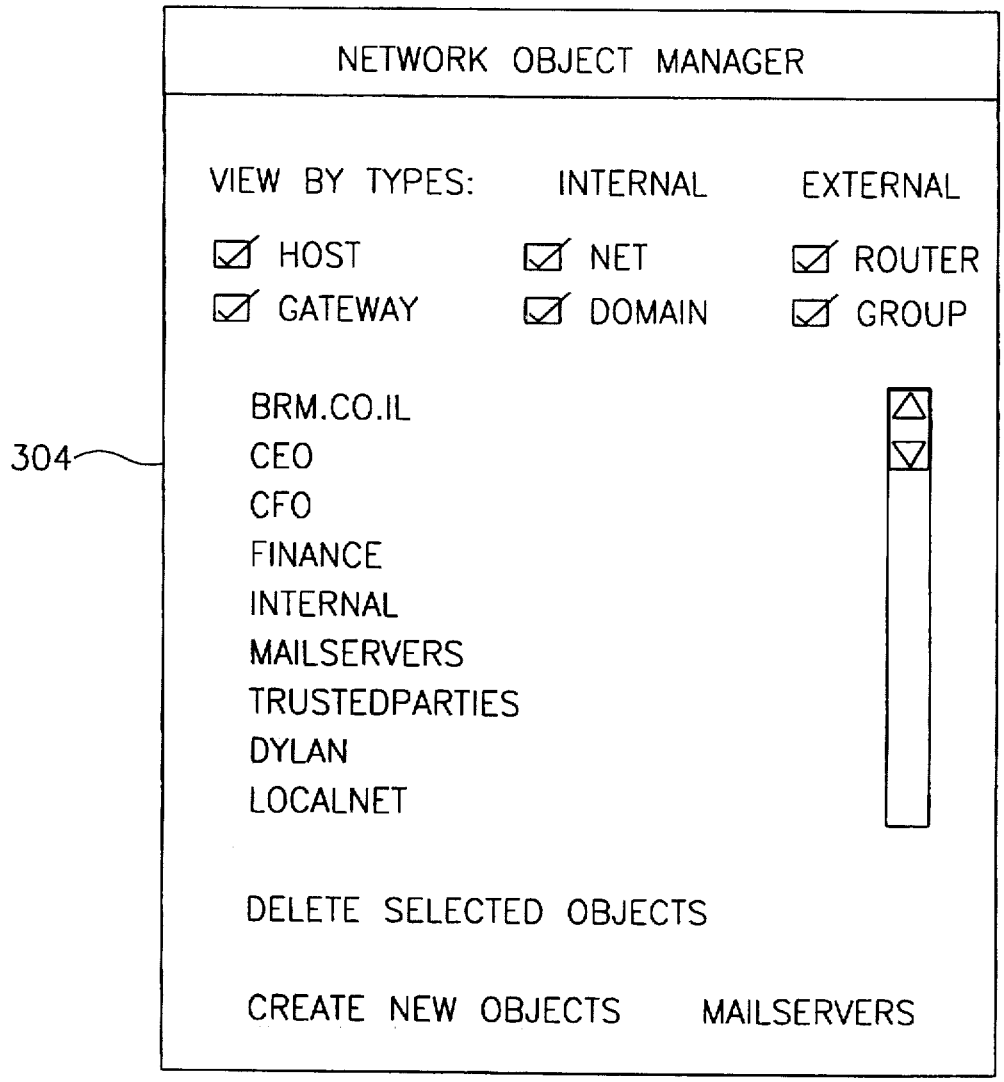
FIG.3/2

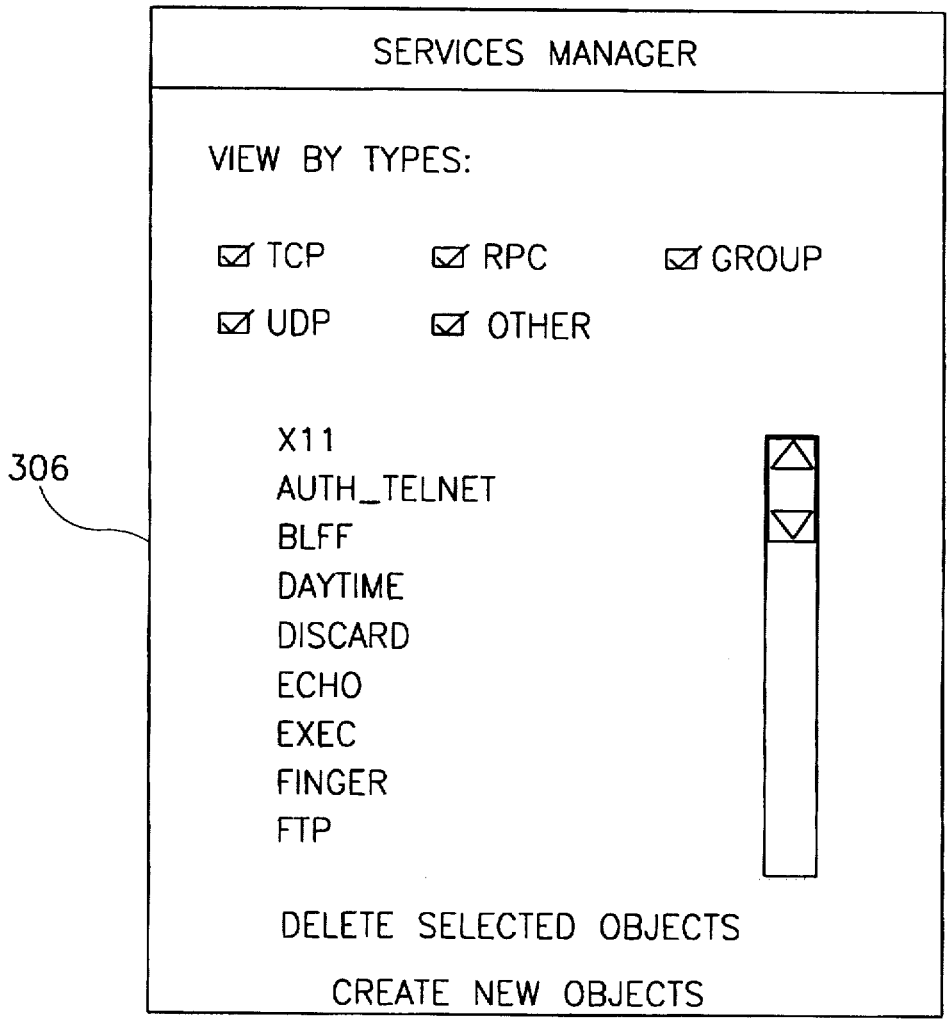
FIG.3/3

RULE BASE EDITOR : CORPORATE

FILE   RULE   FILTER   ROUTER   UTILITES   PROPERTIES   TUTORIAL

WINDOWS: ☑ NETWORK OBJECTS   ☑ SERVICES   ☑ SYSTEM VIEW   ☐ LOG VIEWER

| NO. | SOURCE | DESTINATION | SERVICES | ACTION | TRACK | INSTALL ON |
|-----|--------|-------------|----------|--------|-------|------------|
| 1 | ANY | MAILSERVERS | SMTP | ACCEPT | | GATEWAYS GW |
| 2 | ☐ CEO<br>☐ CFO | FINANCE | ANY | DROP STOP | ALERT | GATEWAYS GW |
| 3 | TRUSTEDPARTIES | INTERNAL | TALK RSTAT TELNET | ACCEPT | | DST |
| 4 | INTERNAL | ANY | ANY | ACCEPT | ALERT | GATEWAYS GW |
| 5 | ANY | INTERNAL FINANCE | ANY | REJECT STOP | MAIL | DST |

RULE BASE SAVED TO '/FW/USERS/MARLUS/CORPORATE.W'

FIG. 3/4

FIG.3/5

SYSTEM FOR SECURING THE FLOW OF AND SELECTIVELY MODIFYING PACKETS IN A COMPUTER NETWORK

REFERENCE TO RELATED APPLICATIONS

This application is a continuation-in-part of U.S. patent application Ser. No. 08/168,041, filed on Dec. 15, 1993, U.S. Pat. No. 5,606,668.

BACKGROUND OF THE INVENTION

This application relates, in general, to a method for controlling computer network security. More specifically it relates to an easily alterable or expandable method for computer network security which controls information flow on the network from/to external and internal destinations.

Connectivity and security are two conflicting objectives in the computing environment of most organizations. The typical modern computing system is built around network communications, supplying transparent access to a multitude of services. The global availability of these services is perhaps the single most important feature of modern computing solutions. Demand for connectivity comes both from within organizations and from outside them.

Protecting network services from unauthorized usage is of paramount importance to any organization. UNIX workstations, for example, once connected to the Internet, will offer all the services which it offers another station on the next table to the entire world. Using current technology, an organization must give up much of its connectivity in order to prevent vulnerability, even to the extent of eliminating all connections to the outside world or other sites.

As the need for increased security grows, the means of controlling access to network resources has become an administrative priority. In order to save cost and maintain productivity, access control must be simple to configure and transparent to users and applications. The minimization of setup costs and down time are also important factors.

Packet filtering is a method which allows connectivity yet provides security by controlling the traffic being passed, thus preventing illegal communication attempts, both within single networks and between connected networks.

Current implementation of packet filtering allows specification of access list tables according to a fixed format. This method is limited in its flexibility to express a given organization's security policy. It is also limited to the set of protocols and services defined in that particular table. This method does not allow the introduction of different protocols or services which are not specified in the original table.

Another method of implementing packet filtering is tailoring the computer operating system code manually in every strategic point in the organization. This method is limited by its flexibility to future changes in network topology, new protocols, enhanced services and to future security threats. It requires a large amount of work by experts modifying proprietary computer programs, making it insufficient and expensive to setup and maintain.

In addition, the need for secure long distance communications between enterprises, branch offices and business partners is becoming an essential requirement in modern day business practice. Historically, dedicated point-to-point connections between networks were employed for fully private inter-enterprise commerce and long distance transactions. However, their inflexibility and prohibitive cost have prevented their widespread use. Public networks such as the Internet provide a flexible and inexpensive solution for long distance inter-networking. Instead of establishing dedicated lines, enterprises can communicate using the Internet as a mediator. Once connected to a local Internet provider, private networks can quickly connect to any destination around the world.

A private network that uses some public segments is called a virtual private network (VPN). A VPN is significantly less expensive and more flexible than a dedicated private network. Each of the private networks need only be connected to a local Internet provider. Adding new connections is simple and inexpensive. However, a major disadvantage of a VPN is that it is insecure because of its insecure segments. The Internet connection exposes the enterprise to the following two dangers: (1) unauthorized Internet access into internal enterprise networks (break-ins) and (2) eavesdropping on and tampering the enterprise communication as they pass through the Internet.

The security risks involved in communicating over the Internet have deterred enterprises from taking full advantage of VPNs. Doing business over the Internet (e.g., transferring funds, obtaining and verifying credit information, selling and delivering products) requires a reliable and effective security solution.

SUMMARY OF THE INVENTION

Accordingly, the present invention seeks to provide an improved flexible, easily-alterable security method which controls information flow on a computer network to that described in copending coassigned U.S. patent application Ser. No. 08/168,041.

Another object of the invention is to control information flow on the network from/to internal as well as external destinations where the control includes at least one of the encrypting the information and modify the source and/or destination address.

Yet another object of the invention is to control information flow by means of a packet filter capable of examining every packet of information flowing past a node in the system, the packet being encrypted.

A further object of the invention is to control information flow by the packet filter wherein the packet filter is capable of passing the packet only if it is preauthorized, preferably after a nondestructive connection validity check.

Another object of the invention is to provide a generic packet filter module which is controlled by a set of instructions to implement a given security policy at a node to accept (pass) or reject (drop) the packet wherein the packet is passed only if it passage is preauthorized.

Yet another object of the invention is to provide a security method for a computer network which is easily alterable by the system administrator without the need to change the nature of the packet filter itself or to write extensive code.

Another object of the invention is to provide an improved connection validity check.

Yet another object of the invention is to provide the ability to modify the packet by any of encrypting it, modifying a destination address, accepting external inputs as criteria for accepting, rejecting or modifying the network communication.

Another object of the present invention is to provide an encryption scheme for securing the flow of data over insecure public networks, such as the Internet, thus forming a VPN.

According to an aspect of the present invention, there is provided a computer system to secure transactions over networks by encrypting them, inter-connect various networks with different addressing schemes and provides ways to pass packets of information only when the source of the communication is authorized and detecting the validity of traffic through the network while minimizing the information required to achieve it, preferably in a fail-safe architecture.

There is provided in accordance with a preferred embodiment of the present invention a method of inspecting and selectively modifying inbound and outbound data packets in a computer network, the inspection and selective modification of the data packets occurring in accordance with a security rule, the method including the steps of generating a definition of each aspect of the computer network inspected by the security rule, generating the security rule in terms of the aspect definitions, the security rule controlling at least one of the aspects, converting the security rule into a set of packet filter language instructions for controlling an operation of a packet filtering module which inspects and selectively modifies the data packets in accordance with the security rule, coupling the packet filter module to the computer network for inspecting and selectively modifying the data packets in accordance with the security rule, the packet filter module implementing a virtual packet filtering machine, and the packet filter module executing the packet filter language instructions for operating the virtual packet filtering machine to either accept or reject the passage of the data packets into and out of the network computer and selectively modify the data packets so accepted.

Further, the aspects can include network objects, network services or network services. In addition, the object definitions include the address of the object and the filter language instructions of the step of converting are in the form of script and further comprise a compiler to compile the script into the instructions executed in the step of executing.

Still further, both the steps of generating the aspects of the network and of the security rule are defined graphically and the selective modification is chosen from the group consisting of encryption, decryption, signature generation and signature verification.

There is also provided in accordance with a preferred embodiment of the present invention, in a security system for inspecting and selectively modifying inbound and outbound data packets in a computer network, the security system inspecting and selectively modifying the data packets in the computer network in accordance with a security rule, where each aspect of the computer network inspected by the security rule has been previously defined, the security rule being previously defined in terms of the aspects and converted into packet filter language instructions, a method for operating the security system including the steps of providing a packet filter module couple to the computer network in at least one entity of the computer network to be inspected by the security rule, the packet filter module implementing a virtual packet filtering machine inspecting and selectively modifying the data packets passing into and out of the computer network, and the packet filter module executing the packet filter language instructions for operating the virtual packet filtering machine to either accept or reject the passage of the data packets into and out of the computer network and to selectively modify the data packets so accepted.

Also provided in accordance with a preferred embodiment of the present invention, in a security system for inspecting and selectively modifying inbound and outbound data packets in a computer network, the security system inspecting and selectively modifying the data packets in the computer network in accordance with a security rule, where each aspect of the computer network inspected by the security rule has been previously defined, the security rule being previously defined in terms of the aspects and converted into packet filter language instructions, a method for operating the security system including the steps of providing a packet filter module coupled to the computer network in at least one entity of the computer network to be controlled by the security rule, the packet filter module emulating a virtual packet filtering machine inspecting and selectively modifying the data packets passing into and out of the computer network, the packet filter module reading and executing the packet filter language instructions for performing packet filtering operations, storing the results obtained in the step of reading and executing the packet filter language instructions in a storage device, and the packet filter module utilizing the stored results, from previous inspections, for operating the packet filter module to accept or reject the passage of the data packets into and out of the computer network and to selectively modify the data packets so accepted.

In addition, there is also provided in accordance with a preferred embodiment of the present invention, in a security system for inspecting and selectively modifying inbound and outbound data packets in a computer network, the security system inspecting and selectively modifying the data packets passing through the computer network in accordance with a security rule, where each aspect of the computer network controlled by the security rule has been previously defined, the security rule being previously defined in terms of the aspects and converted into packet filter language instructions, the security system including a packet filter module coupled to the computer network, the packet filter module operating in accordance with the security rule, the packet filter module implementing a virtual packet filtering machine inspecting and selectively modifying the data packets passing into and out of the computer network, and processing means for reading and executing the packet filter language instruction integral with the packet filter module, the processing means operating the packet filtering module to either accept or reject the passage of the packets into and out of the computer network and to selectively modify the data packets so accepted.

BRIEF DESCRIPTION OF THE DRAWINGS

FIG. 3 shows the computer screen of the network administrator of FIG. 2 in greater detail;

DETAILED DESCRIPTION

Securing Inbound and Outbound Data Packet Flow

Figure 1:
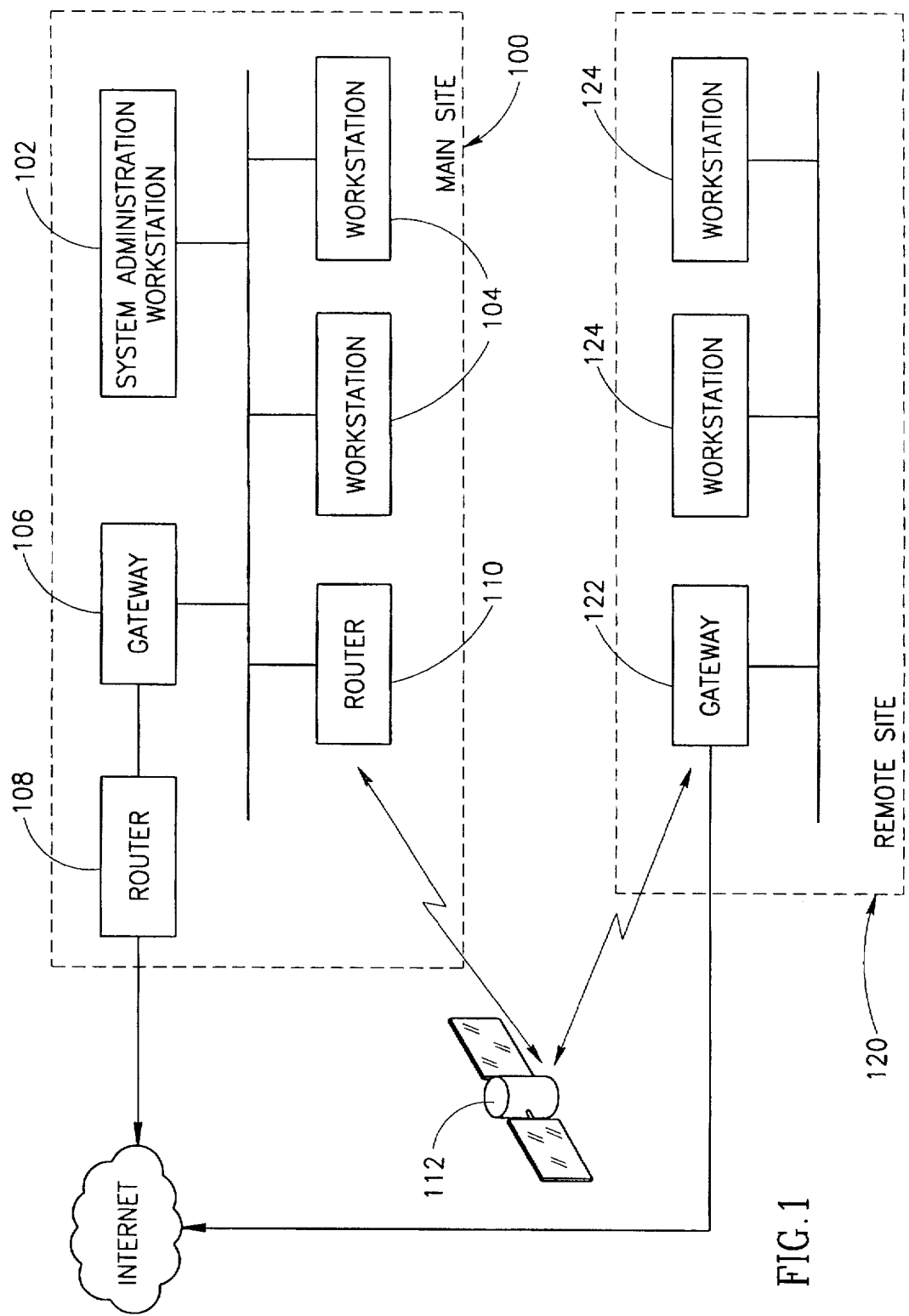
FIG. 1 is an example of a network topology.

Referring now to FIG. 1, an example network topology is shown. In this example, the main site 100 contains a system administrator function embodied in workstation 102. This workstation is coupled to the network which includes workstations 104, router 110 and gateway 106. Router 110 is coupled via satellite 112 to a remote site via gateway 122. Gateway 106 is coupled via router 108 to the Internet. The remote site 120 comprises workstations 124 which are coupled to the network and via gateway 122 to the Internet. The particular configuration shown herein is chosen as an example only and is not meant to limit the type of network on which the present invention can work. The number configurations that networks can take are virtually limitless and techniques for setting up these configurations are well known to those skilled in the art. The present invention can operate on any of these possible configurations.

Figure 2:
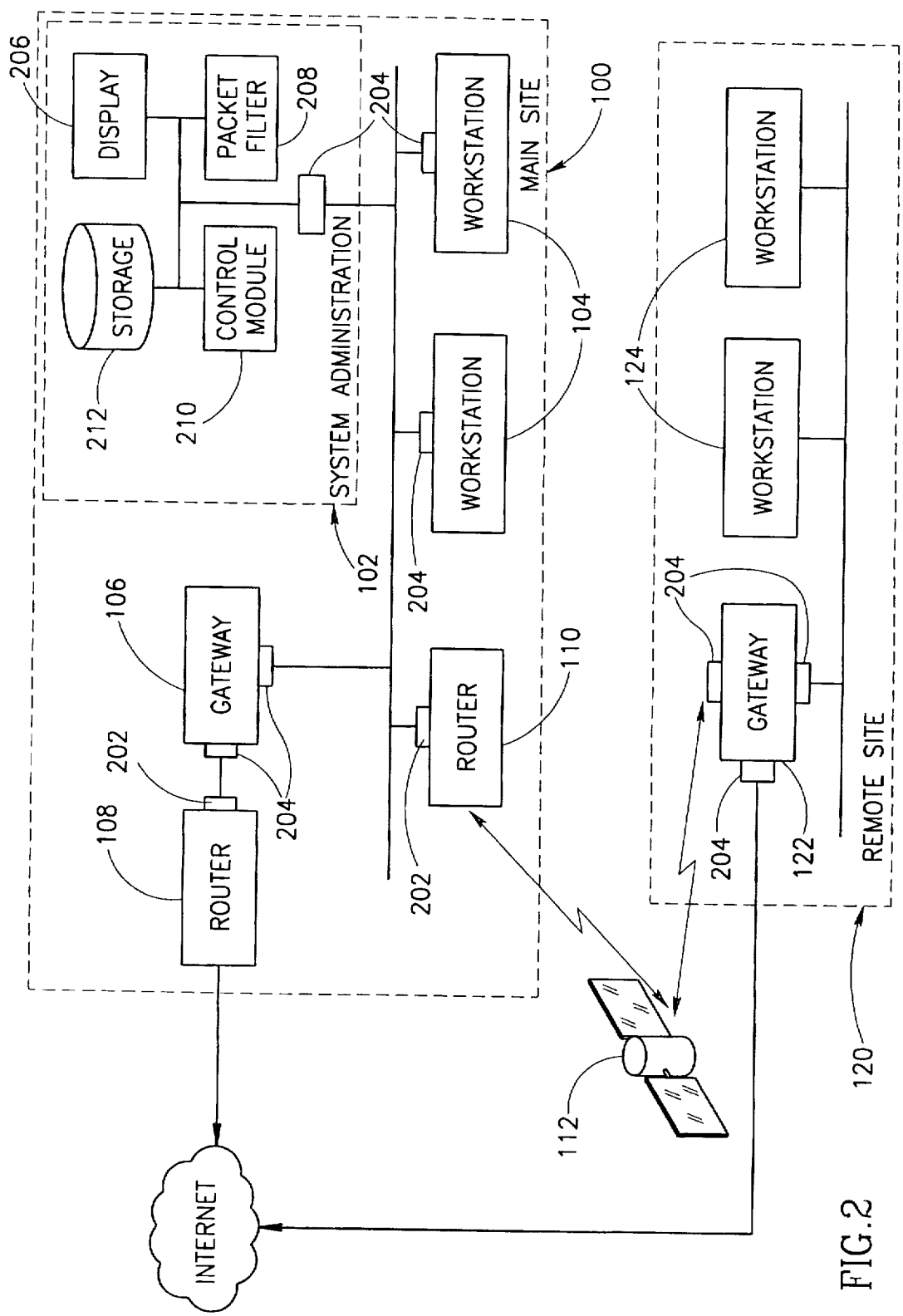
FIG. 2 shows a security system of the present invention applied to the network topology of FIG. 1.

FIG. 2 shows the network of FIG. 1 in which the present invention has been installed. In FIG. 2, elements also shown in FIG. 1 have the same reference numerals. As shown, the system administrator 102 includes a control module 210, a packet filter generator 208, a display 206 and a storage medium 212. Packet filters 204 have been installed on the system administrator, workstations 104 and gateway 106. Gateway 106 has two such filters, one on its connection to the network and one on its connection to the router 108. Routers 108 and 110 each have a programming script table which is generated by the security system, but which forms no part of the present invention, and will not be described in detail. These tables correspond to the tables that are currently utilized to program routers, as is well known to those skilled in the art.

Packet filters 204 are also installed on the gateway 122 of the remote site 120. One packet filter is installed on the connection between the satellite 112 and the gateway 122, a second packet filter is installed on the connection between the Internet and gateway 122 and a third packet filter is installed on the connection between the gateway and the network.

Information flows on the network in the form of packets, as is well known to those skilled in the art. The location of the packet filters in FIG. 2 is chosen so that data flow to or from a particular object of the network, such as a workstation, router or gateway can be controlled. Thus, workstations 104 each have a packet filter so that the information flow to/from these workstations is separately controlled. At the remote site 120, however, the packet filter is placed on the connection between the gateway 122 and the network, thus there is no individual control over the data flow to/from the workstations 124. If such individualized control were required, packet filters could be placed on each of the workstations 124, as well. Each of the packet filters is installed at the time that the network is set up or the security system is installed, although additional packet filters can be installed at a later date. The packet filters are installed on the host device such as the workstation or gateway at which protection is desired.

Each of the packet filters operates on a set of instructions which has been generated by the packet filter generator 208 in the system administrator 102. These instructions enable complex operations to be performed on the packet, rather than merely checking the content of the packet against a table containing the parameters for acceptance or rejection of the packet. Thus, each packet filter can handle changes in security rules with great flexibility as well as handle multiple security rules without changing the structure of the packet filter itself.

The system administrator enters the security rules via a graphical user interface (GUI) which is displayed upon the monitor 206 and explained in more detail with respect to FIG. 3. This information is processed by the packet filter generator 208 and the resulting code is transmitted to the appropriate packet filter or filters in the network to perform the function that is desired. Control module 210 enables the system administrator to keep track of the operations of the network and storage 212 can be utilized to keep logs of operations on the network and attempts of illegal entry into the network. The system operator can thereby be provided with full reports as to the operation of the network and the success or failure of the security rules. This enables the security administrator to make those changes that are appropriate in order to maintain the security of the network without limiting its connectivity.

FIG. 3 shows the computer screen 206 in FIG. 2 in more detail. The screen is broken into four windows, two smaller windows at the left side and two larger windows at the right side. Network objects and services are two aspects of the network which must be defined in the security method of the present invention. Window 304 is used to define network objects such as the workstations, gateways and other computer hardware connected to the system. It is also possible to group various devices together such as, for example, the finance department, the research and development department, the directors of the company. It is thus possible to control data flow not only to individual computers on the network, but also to groups of computers on the network by the appropriate placement of packet filters. This allows the system operator have a great deal of flexibility in the managing of communications on the network. It is possible for example to have the chief financial officer as well as other higher ranking officials of the company such as the CEO and the directors able to communicate directly with the finance group, but filter out communications from other groups. It is also possible to allow electronic mail from all groups but to limit other requests for information to a specified set of computers. This allows the system operator to provide internal as well as external security for the network. The object definition would include the address of the object on the network, as well as a name or group whether the object is internal or external to the network, whether or not a packet filter has been installed on this object and a graphical symbol. The graphical symbol is used in connection with the rule base manager 302.

Similarly, network services are defined in block 306 on the screen. These network services can include login, route, syslog and telnet, for example. Each service is defined by generic and specific properties. The generic properties include the code string that identifies the service, for example 'dport' (destination port) which is equal to 23 for telnet. The code string that identifies the incoming and outgoing packets are identified. Specific properties include the name of the service, the port used to provide the service, the timeout in seconds of how long a connectionless session may stay inactive, that is, having no packet transmitted in either direction before assuming that the session is completed. Other elements of a service definition might include the program number for RPC services and the outbound connections for accepted services that use connectionless protocols such UDP. The graphic symbol and its color are specified.

Block 302 is the rule base manager which allows the new security rule to be entered into the system in a graphical manner, thus freeing the system administrator from having to write code to implement a particular security rule or to change a security rule. Only four elements are required to enter the new security rule into the system. The first element is the source of the data packet and the third element is the destination of the packet. The second element is the type of service that is involved and the fourth element is the action that should be taken. The action that can be taken includes accept the packet in which case the packet is passed from the source to the destination or reject the packet in which case the source is not passed from the source to the destination. If the packet is rejected, no action can be taken or a negative acknowledgment can be sent indicating that the packet was not passed to the destination. In addition, a further element which can be specified is the installation location for the rule which specifies on which objects the rule will be enforced (see FIG. 2). If an installation location is not specified, the system places the packet filter module on the communication destination by default. These objects are not necessarily the destination. For example, a communication from the Internet and destined for a local host must necessarily pass through a gateway. Therefore, it is possible to enforce the rule on the gateway, even though the gateway is neither the source nor the destination. By entering the data with acronyms or graphic symbols, each rule can quickly be entered and verified without the need for writing, compiling and checking new code for this purpose. Thus, the system administrator need not be an expert in programming a computer for security purposes. As long as the service is one of the services already entered into the system, the computer serving as the host for the system administrator function will process the information into a set of instructions for the appropriate packet filter, as described in greater detail below.

Block 308 is a system snapshot which summarizes the setup and operations of the security system. It is not required to practice the present invention. The system snapshot displays a summary of the system using graphical symbols. The summary can include, for example, the host icon, host name, rule base name, which is the name of the file containing the rule base, and the date the rule base was installed on the host. It can also show the status of the host indicating whether or not there have been communications with the host as well as the number of packets inspected by, dropped and logged by the host.

Figure 4:
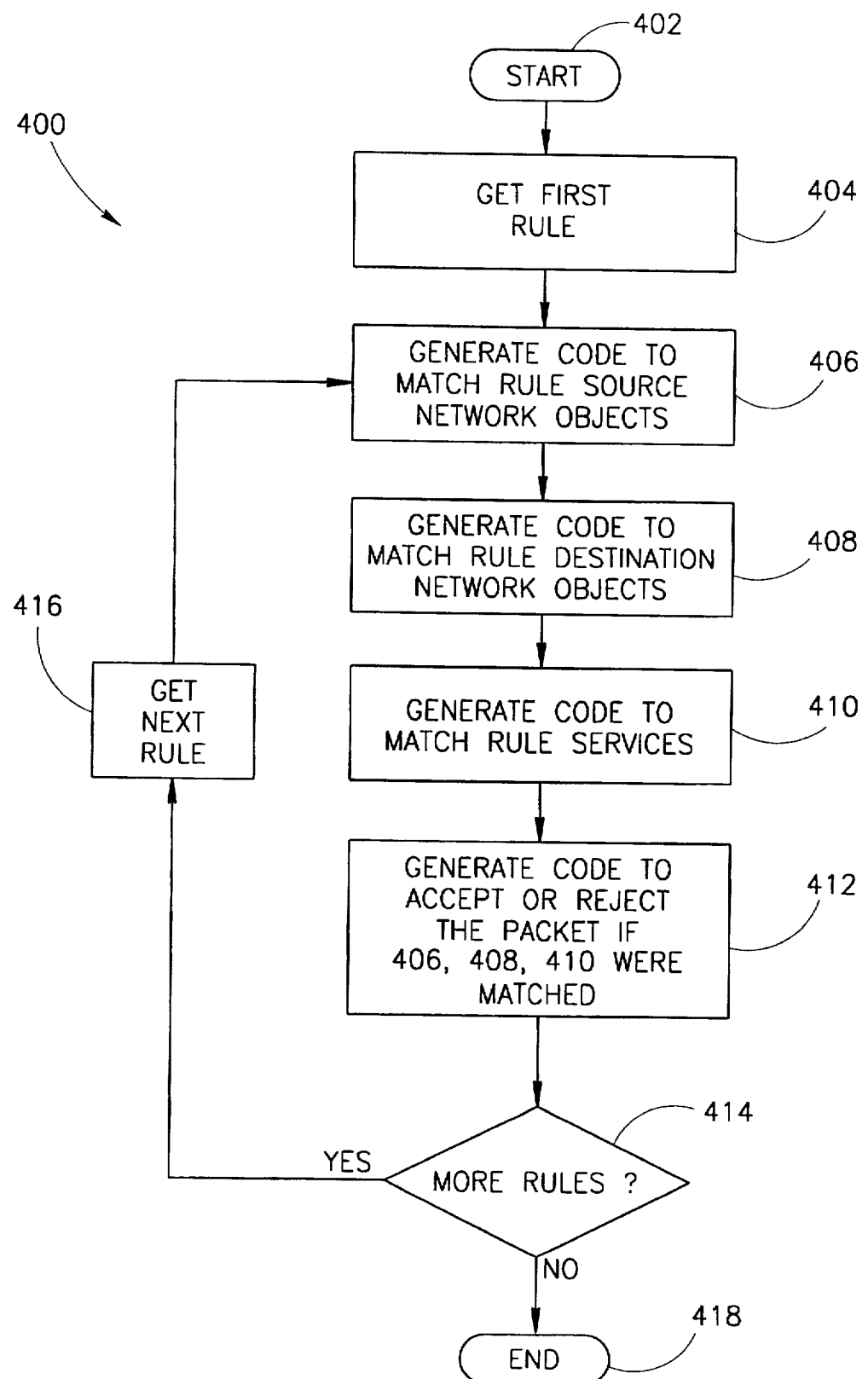
FIG. 4 is a flow diagram of the subsystem for converting graphical information to filter script.

FIG. 4 shows a flow chart of the subsystem for converting the information on the GUI to a filter script which contains the rules utilized for the packet filter. In the preferred embodiment, the output of the filter script generator is compiled into object code which is then implemented by the packet filter module, as described below.

The subsystem 400 starts at 402, proceeds to block 404 which is obtains the first rule from the GUI. The first rule is the first line on the screen in which a new security rule has been identified, as shown in FIG. 3. Control then proceeds to block 406 in which code is generated to match the rule source network objects. That is, the source of the packet is entered into the source code block as representing one of objects of the system from which the data packet will emanate. Control then passes to block 408 in which code is generated in the destination code block to indicate which object of the network the data packet is destined for. Control then passes to block 410 in which code is generated to match the rule services that were chosen. The rule services have been defined previously and are stored within the system or, if not defined, will be defined at the time the security rule regulating the service is entered into the system. Control then passes to block 412 in which code is generated to accept or reject the packet if the data block 406, 408 and 410 were matched, that is, the results of the checks were true. The action to accept or reject is based upon the action chosen in the security rule. Control then passes to the decision block 414 which determines whether or not more rules are to be entered into the system. If no more rules are to be entered into the system, the subsystem terminates at block 418. If more rules are to be entered into the system, control passes to block 416 which obtains the next rule and passes control back to block 406 at which time the process repeats and the next security rule, found on the next line the GUI is processed.

Communication protocols are layered, which is also referred as a protocol stack. The ISO (International Standardization Organization) has defined a general model which provides a framework for design of communication protocol layers. This model serves as a basic reference for understanding the functionality of existing communication protocols.

| ISO MODEL | | |
|---|---|---|
| Layer | Functionality | Example |
| 7 | Application | Telnet, NFS, Novell NCP |
| 6 | Presentation | XDR |
| 5 | Session | RPC |
| 4 | Transport | TCP, Novel SPX |
| 3 | Network | IP, Novell IPX |
| 2 | Data Link (Hardware Interface) | |
| 1 | Physical (Hardware Connection) | |

Different communication protocols employ different levels of the ISO model. A protocol in a certain layer may not be aware to protocols employed at other layers. This is an important factor when making security actions. For example, an application (Level 7) may not be able to identify the source computer for a communication attempt (Levels 2–3), and therefore, may not be able to provide sufficient security.

Figure 5:
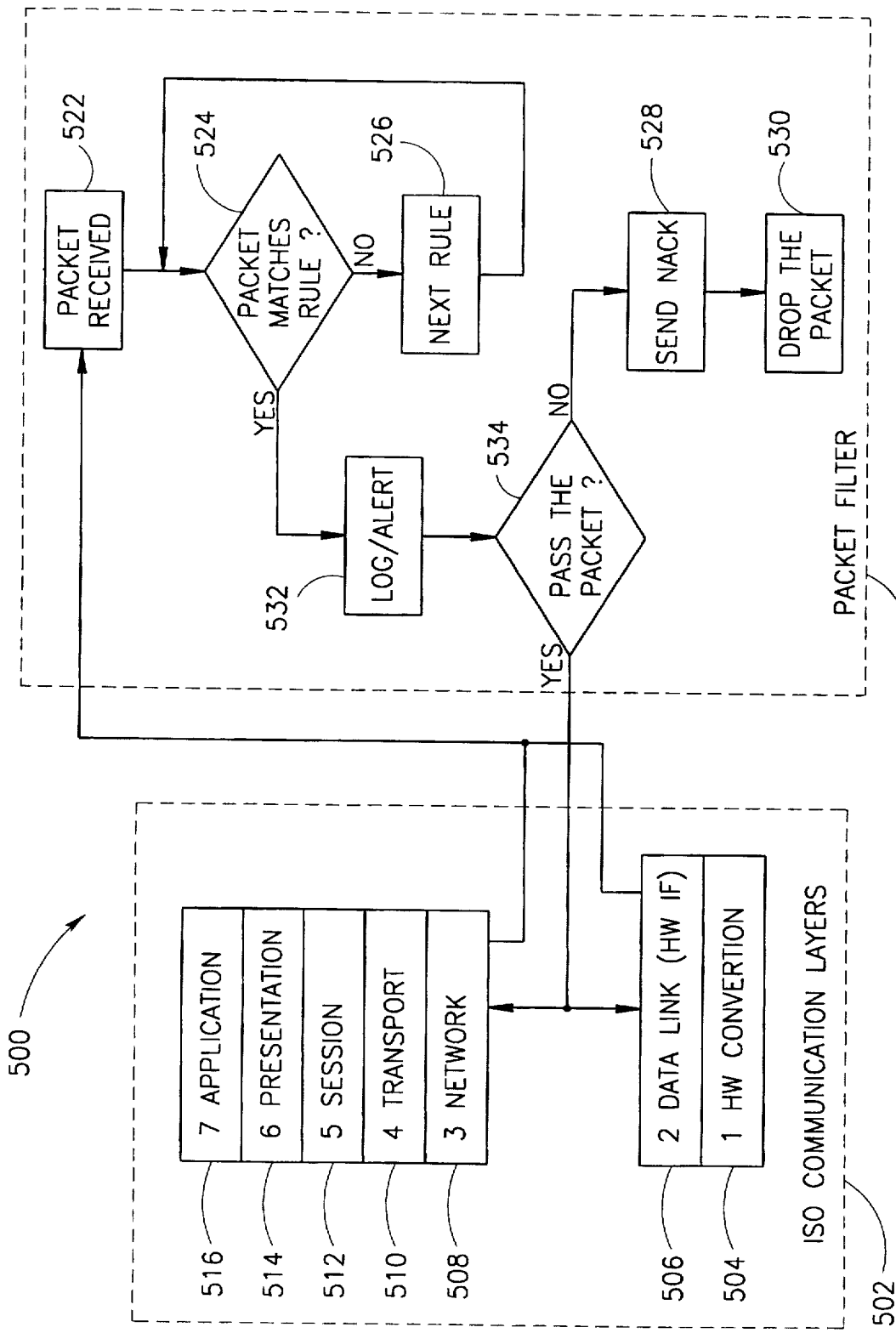
FIG. 5 is a flow diagram of an information flow on a computer network employing the present invention.

FIG. 5 shows how a filter packet module of the present invention is utilized within the ISO model. The communication layers of the ISO model are shown at 502 at the left hand portion of FIG. 5. Level 1, block 504, is the hardware connection of the network which may be the wire used to connect the various objects of the network. The second level, block 506 in FIG. 5 is the network interface hardware which is located in each computer on the network. The packet filter module of the present invention intercedes between this level and level 3 which is the network software. Briefly, for the sake of completeness, the other levels of the ISO model are level 4, block 510 which relates to the delivery of data from one segment to the next, level 5, block 512, synchronizes the opening and closing of a "session" on the network. Level 6, block 514 relates to the changing of data between various computers on the network, and level 7, block 516 is the application program.

A packet entering the computer on which the packet filter module resides passes through layers 1 and 2 and then is diverted to the packet filter 520, shown on the right hand portion of FIG. 5. The packet is received in block 522. In block 524, the packet is compared with the security rule and a determination is made as to whether or not the packet matches the rule. If the packet matches the rule, it may be logged on the system administrator's log and, if an illegal attempt has been made to enter the system, an alert may be issued. Control then passes to block 534 in which a decision is made whether or not to pass the packet based upon the requirements of the security rule. If the decision is to pass the packet, the packet is then passed to level 3, block 508. If a decision is not to pass the packet, a negative acknowledgment (NACK) is sent at block 528, if this option has been chosen, and control passes to clock 530 where the packet is dropped, that is, it is not passed to its destination. Similarly, if an application generates a packet which is to be sent to another destination, the packet leaves the ISO model at level 3, block 508 and enters block 522 and proceeds by an identical process except that if the packet is to be passed it is passed to level 2, block 506 and not level 3, block 508. On level 2, the packet is then sent onto the network at block 504, level 1. If the packet does not match the rule, the next rule will be retrieved and the packet examined to see if it matches this rule. A default rule is provided which matches any packet regardless of the source destination or service specified. This "empty rule" only has an action, which is to drop the packet. If no other rule is matched, this rule will be retrieved and will be effective to drop the packet. Dropping the packet is the safest step to take under these circumstances. The "empty rule" could, of course, be written to pass the packet.

Figure 6:
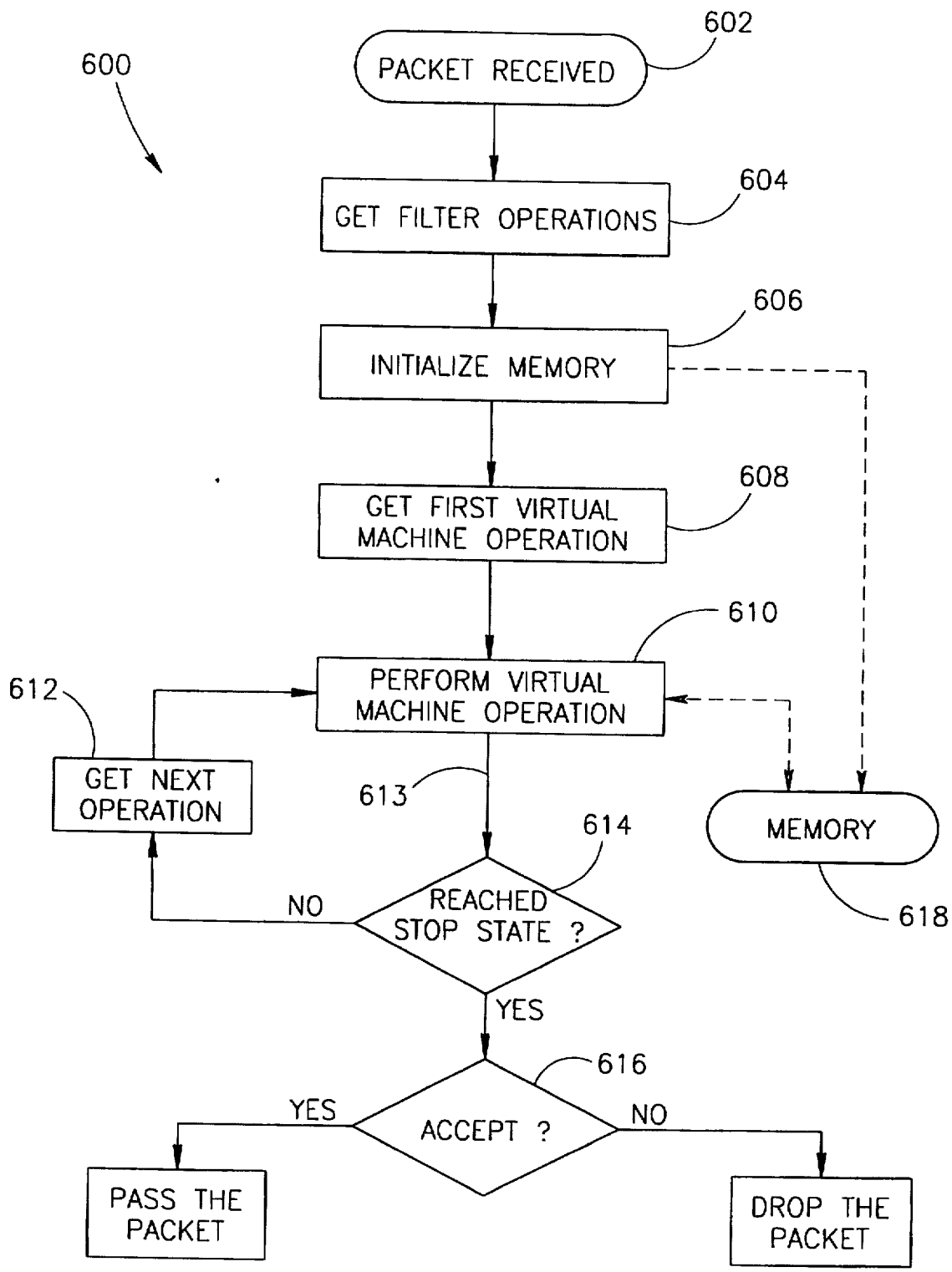
FIG. 6 is a flow diagram of the operation of the packet filter shown in FIG. 5.

Referring to FIG. 6, 600 is a detailed description of the block 520 of FIG. 5. The generalized description in FIG. 6 and the more detailed descriptions shown in FIGS. 7–10 comprise a definition of the term "packet filter module" as the term is utilized herein. The capabilities shown in those figures are the minimal capabilities for the packet filter module to operate. FIGS. 11–15 show addition features which may also be included in the packet filter module, but are not required in the minimal definition of the term.

The packet filter module is embodied in a "virtual machine", which, for the purposes of this application, may be defined as an emulation of the machine shown in FIGS. 6–10 residing in the host computer, which is a computer on the network.

The virtual machine starts at block 602 in which the packet is received, which corresponds to block 522 of FIG. 5. Control passes to block 604 in which the filter operations are obtained from the instruction a memory (not shown). These filter operations are the filter operations that have been generated by the packet filter generator 208 shown in FIG. 2. Control then passes to block 604 in which the filter operations are obtained and then to block 606 in which the memory 618 is initialized. In block 608, the first virtual machine operation is obtained and performed in block 610. The virtual machine contains a memory mechanism such as a stack or register 618 which may be utilized to store intermediate values. The utilization of this stack or register is shown in greater detail in connection with the table shown below. Control then passes to decision block 614 in which it is determined whether or not the stop state has been reached. If the stop state has been reached, the decision will have been made to accept or reject the packet, which decision is implemented at block 616. If the packet has been passed, the packet will proceed as shown in FIG. 5. If the packet is rejected, it will be dropped and a negative acknowledgment may be sent as shown in blocks 528 and 530. If the stop state has not been reached in block 614, the next operation is obtained in block 616 and the process repeats starting with block 610.

Figure 7:
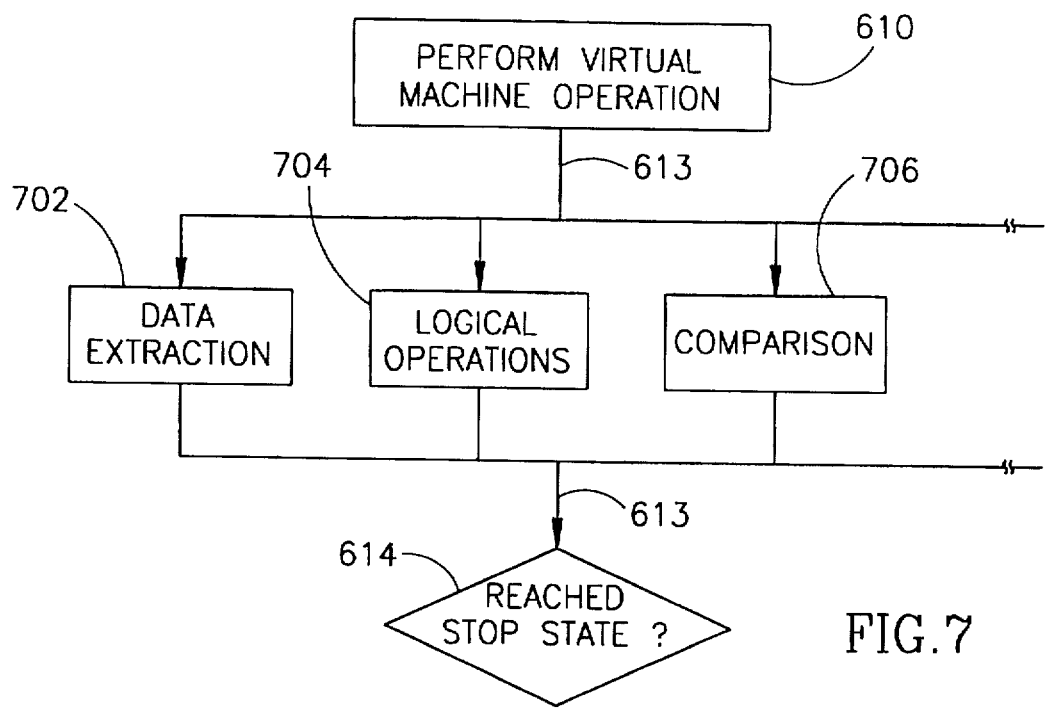
FIG. 7 is a flow diagram showing the virtual machine operations shown in FIG. 6.

The type of operations that can be performed in step 5, block 610 are shown more clearly in FIG. 7. In FIG. 7, block 610 and block 614 are identical to the blocks shown in FIG. 6. Connection 613 is interrupted by three operations which are shown in parallel. For the operation that is to be performed in block 610, control will pass to the appropriate block 702, 704 or 706 in which that task will be performed. In block 702 data extraction will be performed, in block 704 logical operations will be performed and in block 706 a comparison operation will be performed. As shown at the right hand portion of FIG. 7, other blocks can be added in parallel to the operations capable of being performed by the virtual machine. The subset shown as blocks 702, 704 and 706 are the essential elements of the virtual machine of the present invention. These elements are shown in greater detail in FIGS. 8, 9 and 10, respectively. Additional elements which may optionally be included in the operations capable of being performed by the virtual machine are shown in FIGS. 11–15, respectively.

Figure 8:
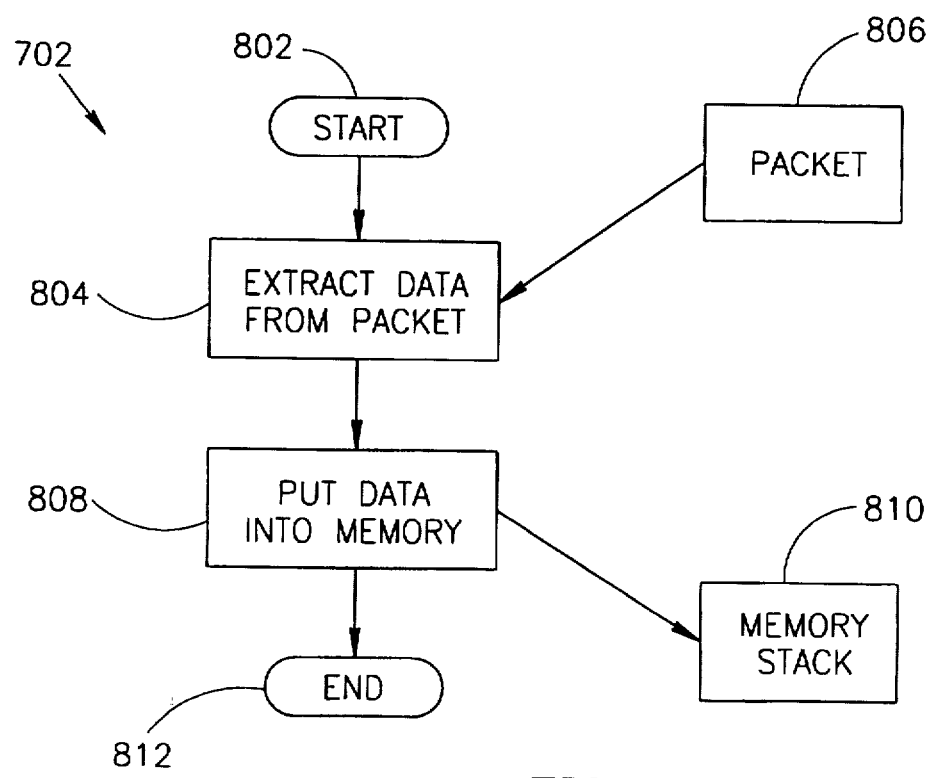
FIG. 8 is a flow diagram of the data extraction method of FIG. 7.

The data extraction block 702 is shown in greater detail in FIG. 8. The process starts at block 802 and control passes to block 804 in which data is extracted from a specific address within the packet 806. This address is taken from the stack memory 618 or from the instruction code. The amount of data extracted is also determined by the stack memory or the instruction code. The extracted data is put into the memory stack 810 at block 808. The process terminates at block 812. In these figures, control flow is shown by arrows having a single line whereas data flow is shown by arrows having double lines.

Figure 9:
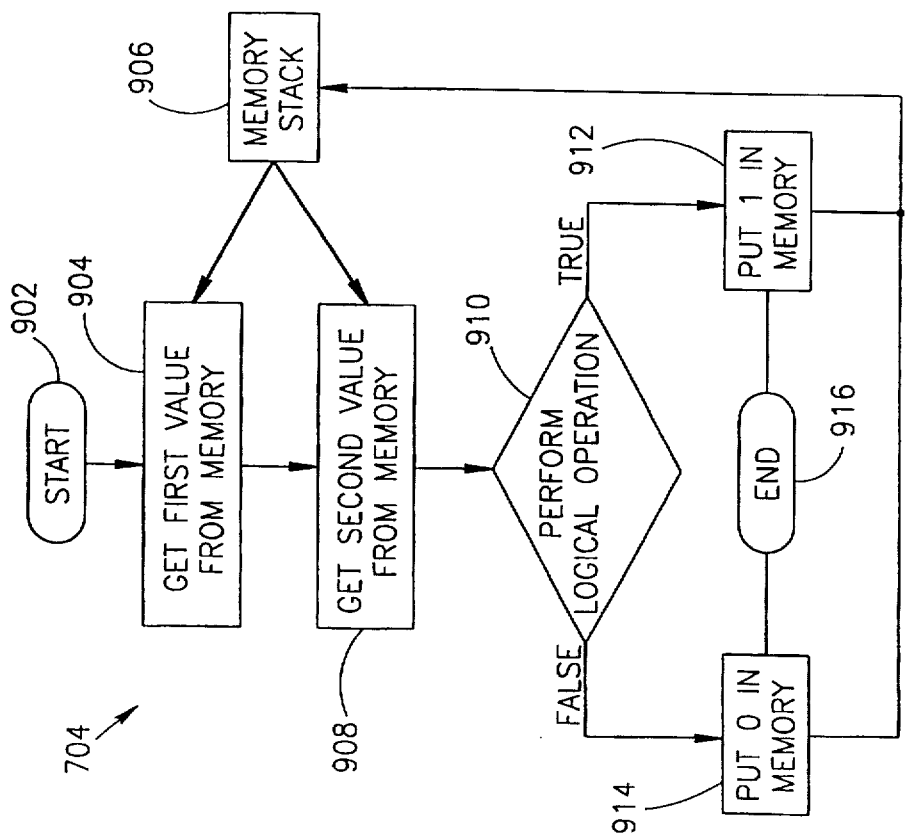
FIG. 9 is a flow diagram of the logical operation method of FIG. 7.

FIG. 9 shows logical operation 704 in greater detail. The logical operation starts at block 902 and control passes to block 904 in which the first value is obtained from the memory 906. In block 908 a second value is obtained from the memory and the logical operation is performed in block 910. If the logical operation is true, a one is placed in the memory 906 at block 912 and if the logical operation is false, a zero is placed in the memory 906 at block 914. The process terminates at block 916.

Figure 10:
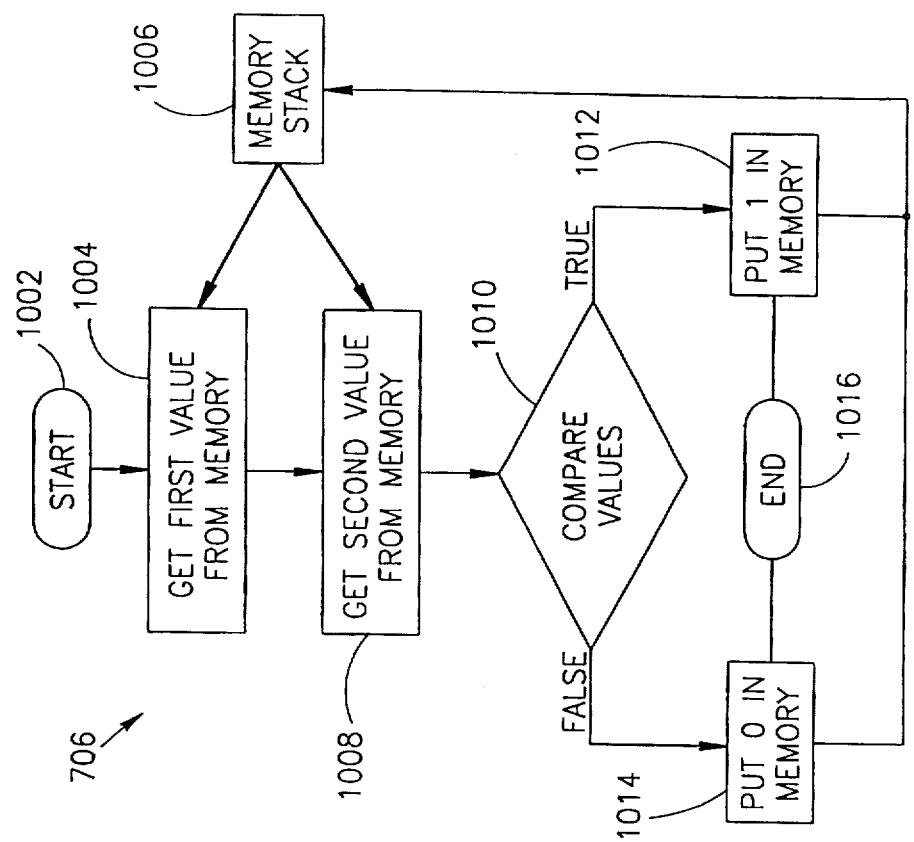
FIG. 10 is a flow diagram of the comparison operation method of FIG. 7.

The third and last required operation for the virtual machine is shown in greater detail in FIG. 10. The comparison operation, block 706, starts at block 1002 and control passes to block 1004 in which the first value is obtained from memory 1006. Control passes to block 1008 in which a second value is obtained from memory 1006. A comparison operation between the first and second values takes place at block 1010. If the comparison operation is true, a one is placed in memory 1006 at block 1012 and if the comparison operation is false a zero is placed in memory 1006 at block 1014. The process terminates in block 1016.

Figure 11:
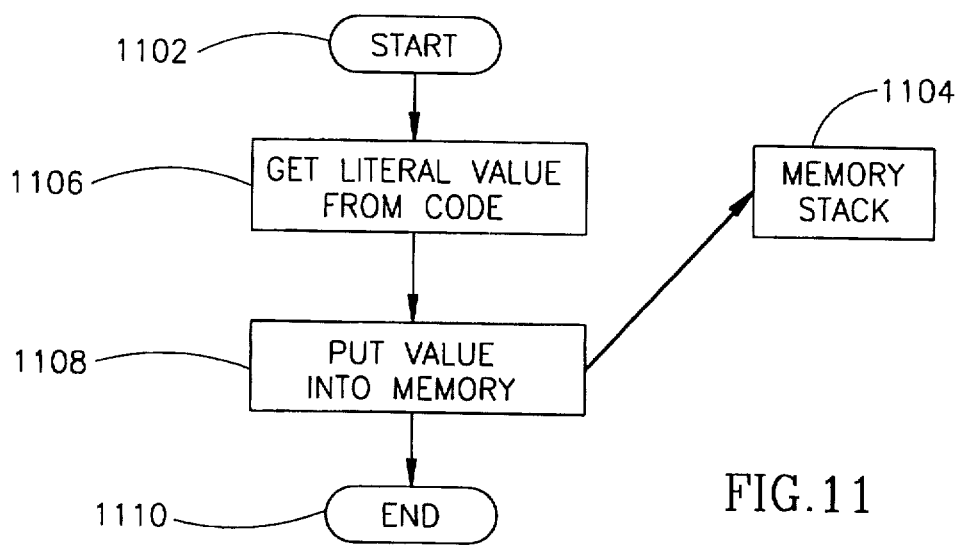
FIG. 11 is a flow diagram of the method of entering a literal value to memory.

The following operations are not shown in FIG. 7 but may be added at the right side of the figure at the broken lines and are connected in the same manner as blocks 702, 704 and 706, that is, in parallel. FIG. 11 shows the entering of a literal value into the memory. The process starts at block 1102 and control passes to block 1106 in which the literal value is obtained from the instruction code. The value is placed into the memory at block 1108 and the process ends at block 1110.

Figure 12:
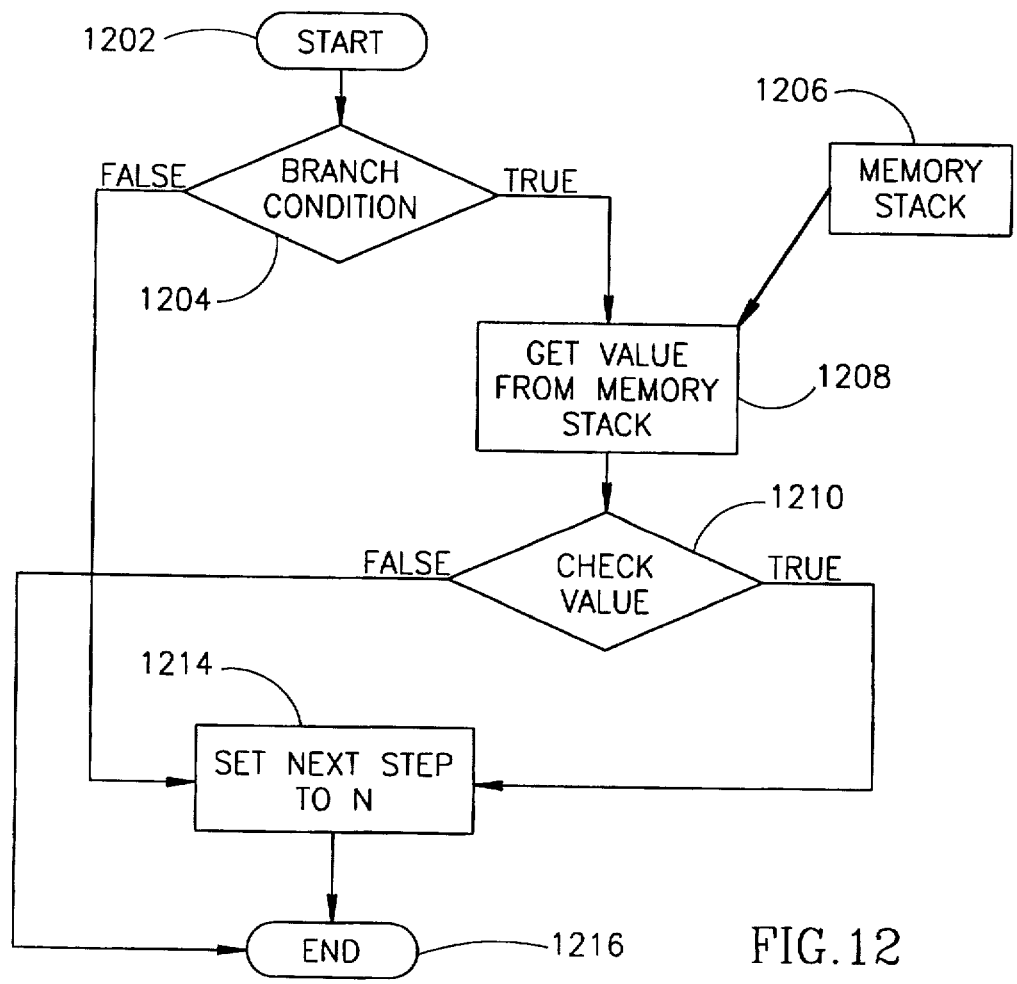
FIG. 12 is a flow diagram of a conditional branch operation.

A conditional branch operation is shown in FIG. 12. The process starts at block 1202 and control passes to block 1204 in which the branch condition, taken from the instruction code, is checked. If the branch condition is true, the value is obtained from the memory stack 1206 at block 1208 and checked at block 1210. If the results of the comparison in block 1210 is true, the next step is set to N and the process terminates at block 1216. If the comparison in block 1210 is false, the process terminates at block 1216. If the branch condition is false, at block 1204, control passes directly to block 1214.

Figure 13:
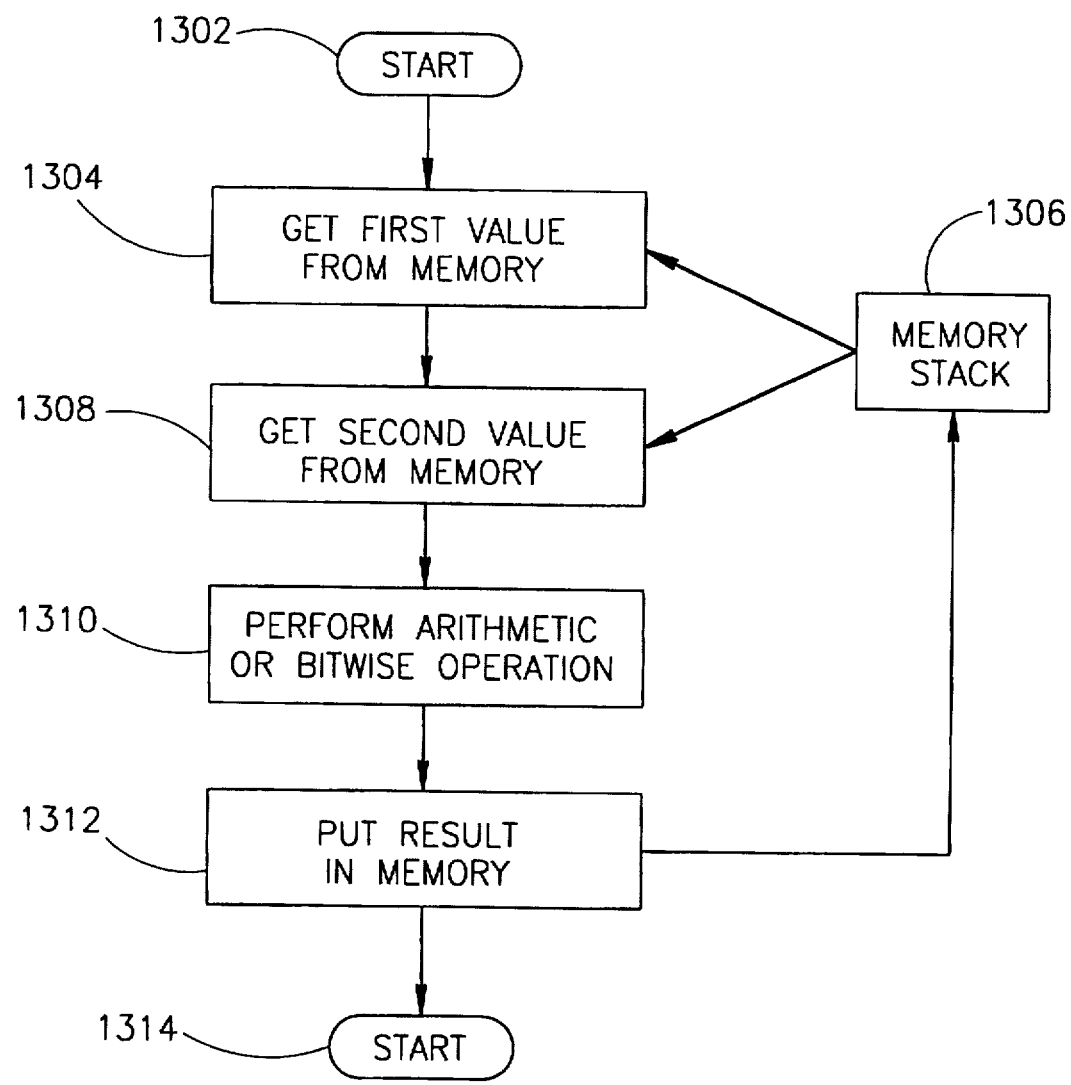
FIG. 13 is a flow diagram of an arithmetic and bitwise operation.

An arithmetic or bitwise operation is shown in FIG. 13. The process starts at block 1302 and control passes to block 1304 in which the first value is obtained from memory 1306. The second value is obtained from memory 1306 at block 1308 and an arithmetic or bitwise operation is performed on the two values obtained from the memory 1306 in block 1310. The result of the arithmetic or bitwise operation is placed in the memory in block 1312 and the process terminates in block 1314.

Figure 14:
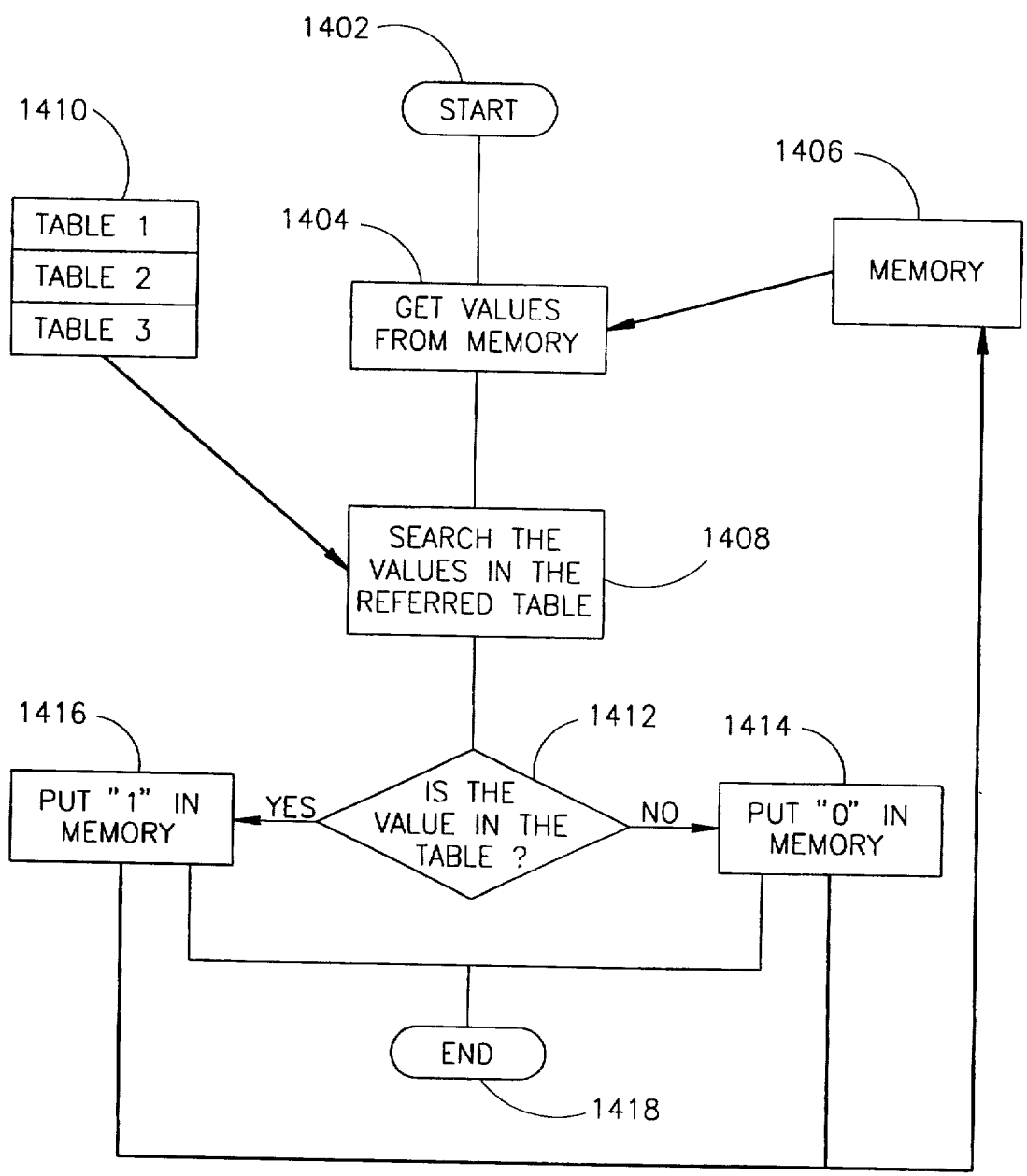
FIG. 14 is a flow diagram of a lookup operation.
Figure 15:
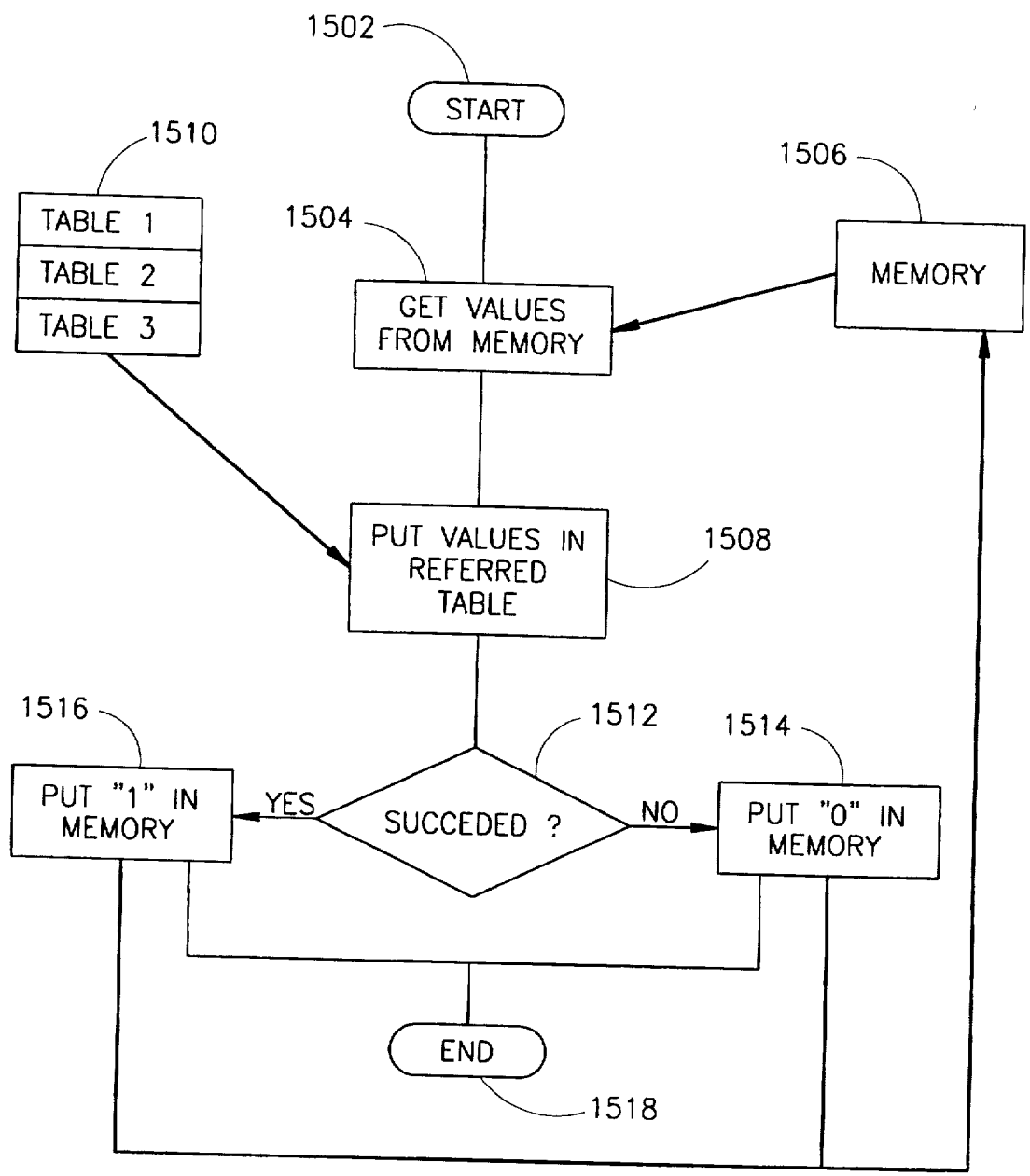
FIG. 15 is a flow diagram of a record operation.

FIG. 14 illustrates a lookup operation which is useful if data needs to passed from a first set of instructions implementing a security rule to a second set of instructions for a second security rule. As shown in block 606 of FIG. 6, the memory is initialized whenever a new security rule is processed. Therefore, information placed in the memory by a first security rule will not be available for use by a second security rule. In order to overcome this problem, a separate memory 1410 is supplied which contains Tables 1–3 which can be utilized for this purpose. The entry of data into the tables is shown in FIG. 15 and described below. The lookup operation starts at 1402 and control passes to 1404 in which values are obtained from memory 1406. Control passes to block 1408 in which data is obtained from Tables 1–3 at block 1410 by searching the values in the referred table. Control passes to block 1412 in which a decision is made as to whether the block is in the table. If the decision is yes, a one is placed in memory 1406 at block 1416. If the decision is no, a zero is placed in memory 1406 at block 1414. The process terminates at block 1418.

Referring to FIG. 15, the process starts at block 1502 and control passes to block 1504 in which values are obtained from memory 1506. Control then passes to block 1508 in which values obtained from memory 1506 are placed in the appropriate locations in Tables 1–3 at block 1510. Control passes to block 1512 in which a decision is made as to whether or not the storage values in the table has succeeded. If the storage has succeeded a one is placed in memory 1506 at block 1516. If the process has not succeeded, a zero is placed in memory 1506 at block 1514. The process terminates at block 1518.

An example of a security rule is implemented using the packet filtering method of the present invention will now be described utilizing as an example the security rule to disallow any Telnet services in the system. Telnet is defined as being a TCP service and having a specific TCP destination port. It will be identified by having a TCP protocol value of 6 in byte location 9 of the packet and by having a destination Telnet protocol number of 23 in byte location 22 of the packet, the value being a two-byte value. This is found in every Telnet request packet.

The first operation in the table shown below is to extract the IP protocol from the packet location 9 and place this in memory. As shown in the "Memory Values" column at the right side of the table, this value, 6, is placed at the top of the stack.

The second operation, the TCP protocol (port) number, which is stated to be 6 above, is placed at the second location in memory. In step 3, the values of the first two layers of the stack are compared, obtaining a positive result.

Drop Telnet Process

| # | Packet Filter Code | Virtual Machine Operation | Memory Values (Stack Order) | | |
|---|---|---|---|---|---|
| 1 | pushbyte [9] | Extract Operation: Extract IP protocol number from packet location 9 to memory | 6 | | |
| 2 | push 6 | Enter Literal Value to Memory: Put TCP protocol number in memory | 6 | 6 | |
| 3 | eq | Comparison Operation: Compare IP protocol to TCP, obtaining a positive result | 1 | | |
| 4 | pushs [22] | Extract Operation: Extract TCP protocol number from packet location 22 to memory | 1 | 23 | |
| 5 | push 23 | Enter Literal Value to Memory: Put TELNET protocol number in memory | 1 | 23 | 23 |
| 6 | eq | Comparison Operation: Compare TCP protocol to TELNET, obtaining a positive result | 1 | 1 | |
| 7 | and | Logical Operation: Check if protocol both TCP and TELNET are matched | 1 | | |
| 8 | btrue drop | Conditional Branch Operation: If memory value is true, branch to drop state | | | |

The values of 6 at the top two layers of the stack are deleted and a 1, indicative of the positive result, is placed at the top of the stack. In step 4, the TCP protocol number for packet location 23 is extracted and placed in the memory location at the second layer of the stack. In step 5, the literal value which is the Telnet protocol number is placed into the memory at the third layer of the stack. In step 6, the memory layers 2 and 3 containing the TCP protocol for Telnet is compared with the expected value, obtaining a positive result. The values of the second and third layers of the stack are deleted and replaced by a 1, indicative of the positive result. In step 7, a logical operation is performed to see if both the TCP and Telnet have been matched. This is determined by a AND operation. In this case the result is positive and the ones in the first two layers of the stack are deleted and replaced by a 1 indicative of the positive result. In step 8, a conditional branch operation is performed in which if the memory value is true, the program branches to the drop state. In this case, the result is true and the program branches to the drop state in which the Telnet request is not passed. Thus the rule to drop Telnet has been implemented.

Encrypting Data Flow—An Introduction

As stated earlier, long distance communications between enterprises, branch offices and business partners have become an essential part of modern day business practice. Utilizing the present invention, virtual private networks (VPNs) can be constructed over insecure public networks such as the Internet to provide secure and flexible communications.

The modification of packets by, e.g., encryption of outbound packets, decryption of inbound packets, signing of packets or address translation is performed by the packet filter module. The decision whether to modify a packet is determined from the rule base. All modifications, i.e., encryption, decryption, signing and address translation are performed on a selective basis in accordance with the contents of the rule base. For encryption, for example, to occur, a rule in the rule base must explicitly call for encryption to occur on packets which have a particular source, destination and service type. The encryption instructions are translated into the packet filter language that are installed and executed on the virtual packet filter machines in the network.

As described previously, the packet filter module determines whether a packet is rejected or accepted. If rejected, the packet is dropped. If accepted, the packet may be modified in a number of ways. Example of types of possible modifications include, but are not limited to, encryption, decryption and address translation. The following describes in detail the encryption and decryption of packets that is selectively performed by the packet filter module.

Notation Used Throughout

The following notation is used throughout this document:

| Symbol | Description |
| --- | --- |
| g | common root used for all Diffie-Hellman keys |
| p | common modulus used for all Diffie-Hellman keys |
| $S_{pvt}$ | source private key |
| $S_{pub}$ | source public key |
| $D_{pvt}$ | destination private key |
| $D_{pub}$ | destination public key |
| B | basic key |
| TB | truncated basic key |
| A | auxiliary key |
| R | session key |
| E | session data encryption key |
| I | session data integrity key |
| M | data portion of a packet |
| P | unencrypted password |
| $ENC_X(Y)$ | encrypt Y using X as the key |
| $DCR_X(Y)$ | decrypt Y using X as the key |
| SIG(Y) | signature of Y |

Definitions of Terms Used Throughout

The following definitions are helpful in understanding the operation of the present invention.

| Term | Definition |
| --- | --- |
| plaintext | text that is not encrypted |
| cleartext | another term for text that is not encrypted |
| ciphertext | encrypted text |
| key | a piece of information known only to the sender and the intended recipient |
| encrytion | converting the plaintext of a message into ciphertext in order to make the message unintelligible to those without the key |
| decryption | converting ciphertext into plaintext using the same key used to encrypt the message |
| certification | a trusted third party, known as a Certificate Authority (CA), from which one can reliably obtain a public key, even over an insecure communication channel, generates a certificate for the public key which can be verified by the recipient |
| digital signature | information generated from the contents of the message itself and used by the recipient to verify the data integrity of the message and/or its origin |
| network object | a piece of hardware that is connected to a network and which has some interaction with the network |
| gateway | a network object that is connected to at least two networks and passes information between them |
| firewall or firewalled network object | a network object, usually a gateway or an end host, that secures the flow of inbound and outbound data packets on a computer network and also selectively modifies data packets in accordance with a security rule base |

Figure 16:
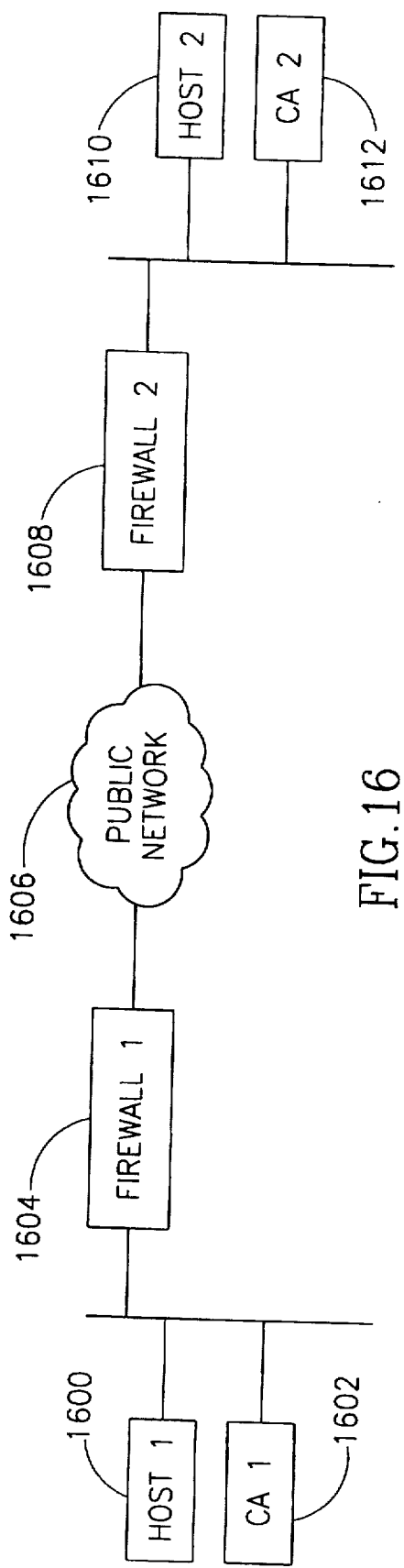
FIG. 16 is a high level block diagram illustrating an example configuration employing firewalls constructed in accordance with the present invention.

A high level block diagram illustrating an example configuration employing firewalls constructed in accordance with the present invention is shown in FIG. 16. The example network shown in this figure will be used to explain the encryption capabilities of the present invention. The network configuration shown is only for illustrative purposes only. Once skilled in the art can adapt the present invention to other network configurations as well. Both host1 and host2 are connected to their respective private LANs. In addition, firewall1 1604 is coupled to host1 through its LAN and firewall2 is coupled to host2 through its LAN. Both firewalls are coupled to a public network 1606 such as the Internet. It is also assumed that the public network is insecure and cannot be trusted. Certificate Authority1 (CA1) 1602 functions as the certificate authority for host1 and firewall1. CA2 1612 functions as the certificate authority for host2 and firewall2. In other embodiments, there may be only a single CA that serves both firewalls. In either embodiment, the functions of the CA remain the same. The only difference is which CA the firewall uses to obtain public keys.

It is desired that the communications between host1 and host2 be secured. The communications from host1 is routed to the Internet (i.e., the public network) via firewall1 which acts as a firewalled network object. Similarly, communications from host2 is routed to the Internet via firewall2 which also acts as a firewalled network object. In communications to host2, firewall1 intercepts and encrypts the packets it receives from host1 enroute to host2. Firewall2 receives the encrypted packets destined for host2 and decrypts those packets. In the opposite directions, firewall2 encrypts the packets from host2 destined for host1. Firewall1 receives the encrypted packets, decrypts them and passes them to host1. The encryption and decryption operations performed by firewall1 and firewall2 are transparent to host1 and host2.

Assuming host1 initiates the session with host2, it sends an Internet Protocol (IP) packet to host2. Firewall1 will intercept the packet and determine that communications between host1 and host2 are to be modified in some way, e.g., encryption, decryption, address translation, etc. The decision is made separately for each connection based on information from all the ISO layers and based on information retained from previous packets. This decision process is termed stateful multi-layer inspection (SMLI). Each firewall maintains a rule base that instructs the firewall how to handle both inbound and outbound communications between network objects, as described in detail earlier. After determining that communications between host1 and host2 are to be encrypted or digitally signed, firewall1 temporarily parks the packet and initiates a session key exchange, which is described in more detail below. Before encrypted communications or signing can take place, both sides need to agree on a shared key. This key is called the session key, R, and is generated anew at the start of every session. It is important to note that only the communications between firewall1 and firewall2 is encrypted because of the use of the insecure Internet or public network. The communications between host1 and firewall1 and between host2 and firewall2 are not encrypted because it takes place over private LANs which can be assumed to be private and secure.

Session Key Exchange—Firewall/Firewall

Figure 17:
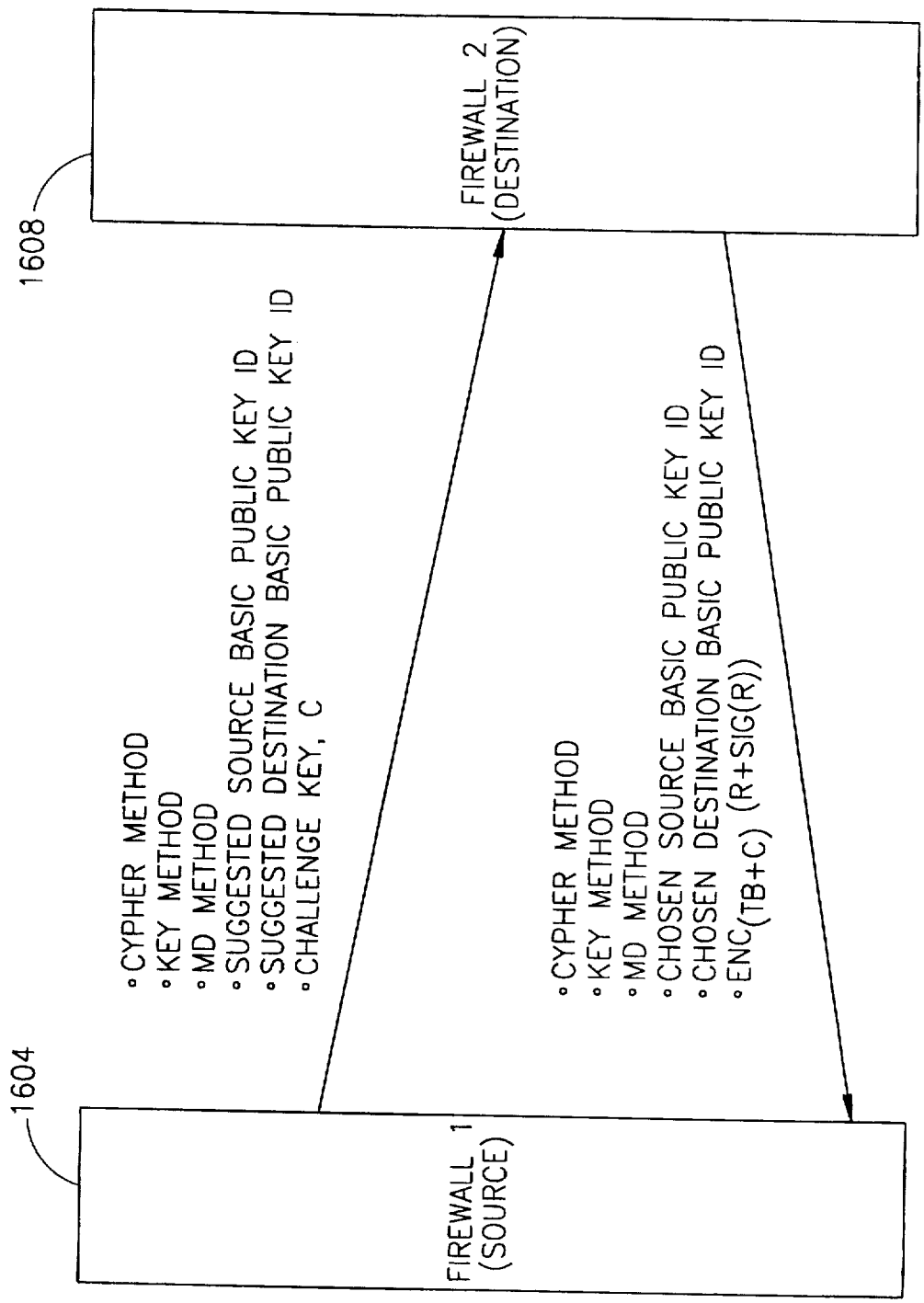
FIG. 17 is a high level block diagram illustrating the data transferred between two firewalls during a session key exchange.

A high level block diagram illustrating the data transferred between two firewalls during a session key exchange is shown in FIG. 17. The following scheme is only one example of implementing encryption with SMLI and is not meant to limit the scope of the present invention to other encryption techniques. It would be obvious to one skilled in the art to adapt other encryption techniques to the SMLI process to carry out the teachings of the present invention. For example, in an alternative embodiment the SKIP standard is utilized. To initiate the encryption of data, firewall1 first sends a request packet to host2. The request packet is sent to host2 and not firewall2 because firewall1 may not know the IP address of the firewall that is responsible for host2. Firewall2 intercepts this request packet and returns a reply packet. The request and reply packets allow both sides to agree on shared session key R that will be used for all communications to be encrypted between host1 and host2. As stated previously, only the communications between firewall1 and firewall2 are actually encrypted.

In general, the session key R is generated by the non-initiator (i.e., firewall2 1608) also called the destination and is sent encrypted to the initiator (i.e., firewall1 1604) also called the source. This two packet exchange must occur before encrypted communications can proceed. After the encrypted session is established, state information is maintained in both firewalls and the original packet that was parked is now passed encrypted through the firewalls. The same session key R is used by firewall2 to encrypt packets that are sent from host2 to host1.

The session key exchange will now be described in more detail. In order to agree on a common secret session key R, the present invention uses a 'static' Diffie-Hellman scheme. Each Diffie-Hellman key comprises a private part and public part. Each side has its own private and public parts. The private key for the source (i.e., firewall1) and destination (i.e., firewall2) is $S_{PVT}$ and $D_{PVT}$, respectively. The public parts for source and destination are then defined as follows:

$$S_{pub} = g^{Spvt}(\text{mod})p$$

$$D_{pub} = g^{Dpvt}(\text{mod})p$$

Both source and destination must know each others public key for the session key exchange to work. If one side does not know the other's public key or the key it does have is determined to be out of date, than a basic key exchange is triggered which is explained in more detail below. Both sides use each other's public key to derive at the basic key B. The source performs the following:

$$B = \{g^{Dpvt}(\text{mod})p\}^{Spvt}(\text{mod})p = g^{SpvtDpvt}(\text{mod})p$$

Similarly, the destination performs the following:

$$B = \{g^{Spvt}(\text{mod})p\}^{Dpvt}(\text{mod})p = g^{SpvtDpvt}(\text{mod})p$$

Thus, both sides share the basic key B. For use in encrypting the session key R, a truncated version of the basic key B is generated, called TB.

In general, each firewall maintains a table of bindings between Diffie-Hellman keys and firewalled network objects. In addition, a firewall must have a binding between IP addresses and such an object. In the configuration shown in FIG. 17, a database within firewall1 must be configured so that it knows of firewall2's existence. Firewall1 must also know that host2's encrypting firewall is firewall2. Firewall1 can have a list of potential firewalls that may serve as encrypting firewalls for firewall2. The bindings and the network object database for each firewall are managed in static fashion by a separate management unit.

In order to encrypt communications between firewalls, a firewall must have knowledge of its own basic private key and the basic public keys of each firewalled network object it needs to communicate with. The basic public keys belonging to external firewalled network objects such as a firewall belonging to a business partner must also be known in order for encrypted sessions to occur. This static binding of basic keys to firewalled network objects may already be established in a database internal to the firewall or it can be obtained on the fly using the basic key exchange described below.

Once a common shared secret basic key B is agreed upon by the two firewalls, it is used to encrypt the actual key used for the session, i.e., the session key R. The same session key R is used by both source and destination to encrypt the data from host1 to host2 and from host2 to host1.

The elements of the request from the source to the destination is shown above the right arrow in FIG. 17. The cipher method comprises one or more encryption methods for encrypting the session data that the source is able to perform (e.g., DES, FWZ1, RC4, RC5, IDEA, Tripple-DES, etc.). The key method comprises one or more encryption methods for encrypting the session key R that the source is able to perform (e.g., DES, FWZ1, RC4, RC5, IDEA, Tripple-DES, etc.). The md method (i.e., message digest method) or the message integrity method comprises one or more methods or algorithms for performing data integrity that the source is able to perform (i.e., MD5, SHA, etc.). The data integrity typically entails calculating a cryptographic hash of a part of or all of the message.

The suggested source public key ID identifies, via an ID number, the basic public key that the source assumes the destination will use. Likewise, the suggested destination basic public key ID identifies the basic public key that the source assumes the destination will use. If there are more than one possible firewalled network object serving host2, the source will include multiple suggested basic public keys in the request packet since it does not know which of the firewalled network object actually serves host2. Each suggested basic public key corresponds to a different firewalled network object.

The request also comprises a challenge key C which is a random bit field chosen by the source (i.e., firewall1) which is used to thwart man in the middle attacks against the session key exchange or the session data itself.

The destination (i.e., firewall2) receives the request packet and based on its contents generates a reply packet to be sent back to the source. The elements of the reply packet are shown above the left arrow in FIG. 17. The reply packet has a similar format as the request packet with the exception of the challenge key C field replaced by a field holding the encrypted session key R. Each of the cipher method, key method and md method now have only one element rather than a list of options as in the request. The elements listed are the elements chosen by the destination from the options listed in the request. Similarly, the chosen source basic public key ID and the chosen destination basic public key ID both comprise a single key ID representing the key ID chosen by the destination from the option list sent in the request.

The session key R that is sent in the reply actually comprises two keys: a session data encryption key E and a session data integrity key I. Thus, the session key R is defined as $$R=E+I$$

The session key is a random stream of bytes that is generated for both the cipher method (i.e., encryption method) and the md method or method digest method. Its length is the sum of the key lengths needed by the cipher method and the md method. Once generated, a signature of the session key is obtained using the chosen md method, e.g., MD5, and represented by SIG(R). The combination of session R and SIG(R) are then encrypted using a key formed by the combination of the truncated basic key TB and the challenge C, thus forming $$ENC_{(TC+C)}(R+SIG(R))$$

which is what is sent in the reply to the source.

The signature or hash checksum computation provides authentication to the source that the packet it received is indeed formed by an entity that knows the basic key B thus providing strong authentication for the reply packet. In addition, since the source chose the challenge key C, there is no possibility of replay.

Session Data Exchange

Figure 18:
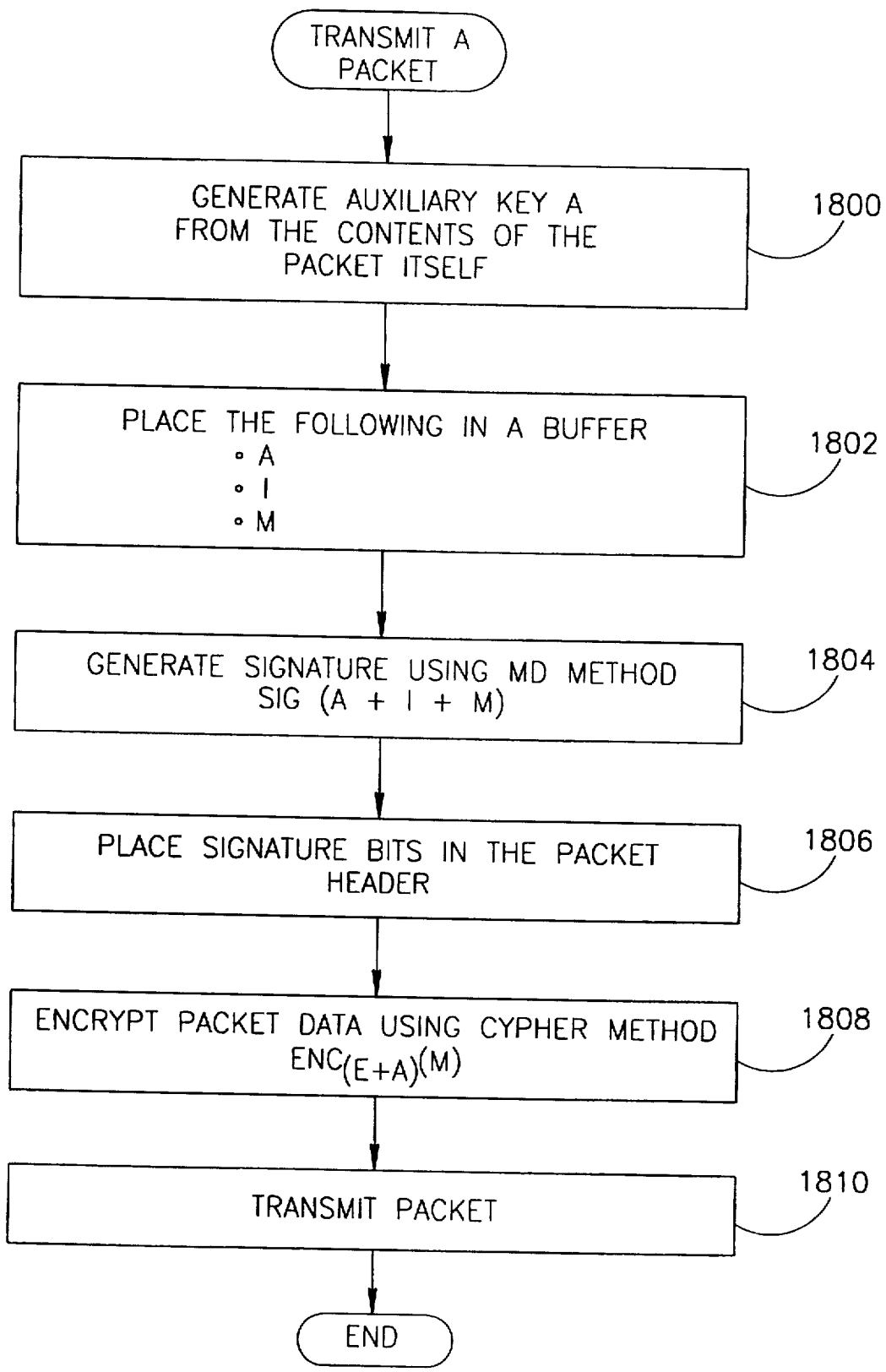
FIG. 18 is a high level logic flow diagram illustrating the process performed by a firewall in transmitting a packet using encryption to another firewall during a session data exchange.

A high level logic flow diagram illustrating the process performed by a firewall in transmitting a packet using encryption to another firewall during a session data exchange is shown in FIG. 18. Although not shown in the Figures, an alternative embodiment utilizes the IPSEC standard for performing session data exchange. As mentioned earlier, once the source and the destination agree on a session key R, encrypted communication between both firewalls can proceed. Interception of and modifications to the packets occur between level 2 and level 3 of the ISO model. Communications occurring both ways is to be encrypted and decrypted using the same session key R. The packets that are sent out closely resemble normal TCP/IP packets. The packets do not include any information indicating whether the packets are encrypted or not and if so which key to use. This information only exists in the state maintained by the two firewalls. The encryption is performed in place without changing the length of the packet which serves to increase the efficiency and bandwidth of encrypted traffic. In general, each transmitted packet is divided into two parts, a cleartext part which is not encrypted and a ciphertext part which is encrypted. The cleartext part includes the IP header and the TCP/UDP header. The rest of the packet meaning its data M is encrypted using a combination of the session key R and an auxiliary key A computed from its cleartext part. The process will now be described in more detail.

The first step performed by a firewall in transmitting a packet is to generate an auxiliary key A from the cleartext contents of the packet itself (step 1800). The portions used depend on the type of packet and protocol (e.g., RPC, UDP, TCP, ICMP, etc.) and may include the following fields, for example, IP-ID (only a portion), RPC-XID, RPC-PROGNUM, TCP-SEQ, TCP-ACK, UDP-LEN, ICMP-TYPE, ICMP-CODE and IP-PROTO. Next, the auxiliary key A, session data integrity key I and the data portion of the packet M are placed in a buffer (step 1802). A signature is then generated on the contents of the buffer using the md method (step 1804) and expressed as $$SIG(A+I+M)$$

The bits of the signature generated are then placed in the packet header (step 1806). Adding the signature bits to the packet is important for ensuring data integrity. Since the length of the packet is not modified some portions of the packet must be overwritten with the signature bits. Note that the signature bits are stored in the packet before the packet is encrypted. For TCP packets a 28 bit signature is stored as follows:

the 8 LSBits of the signature replace the 8 MSBits of the IP-ID the next 16 bits are added to the TCP-CSUM field using 1's complement arithmetic the next 4 bits are stored in the unused TCP-X2 nibble (this is optional)

For UDP packets a 32 bit signature is stored as follows:

the first 16 bits of the signature are added to the UDP-CSUM field using 1's complement arithmetic; if the original UDP-CSUM field is zero, the UDP-SPORT and UDP-DPORT fields are added to the UDP-CSUM also using 1's complement arithmetic the next 16 bits are stored in the UDP-LEN field Once the signature bits are stored in the packet, the data portion of the packet M is encrypted (step 1808), and can be expressed by $$ENC_{(E+A)}(M)$$

The encryption is performed using the cipher method with a combination of the session data encryption key E and the auxiliary key A. Finally, the packet is transmitted over the public network (step 1810).

Figure 19:
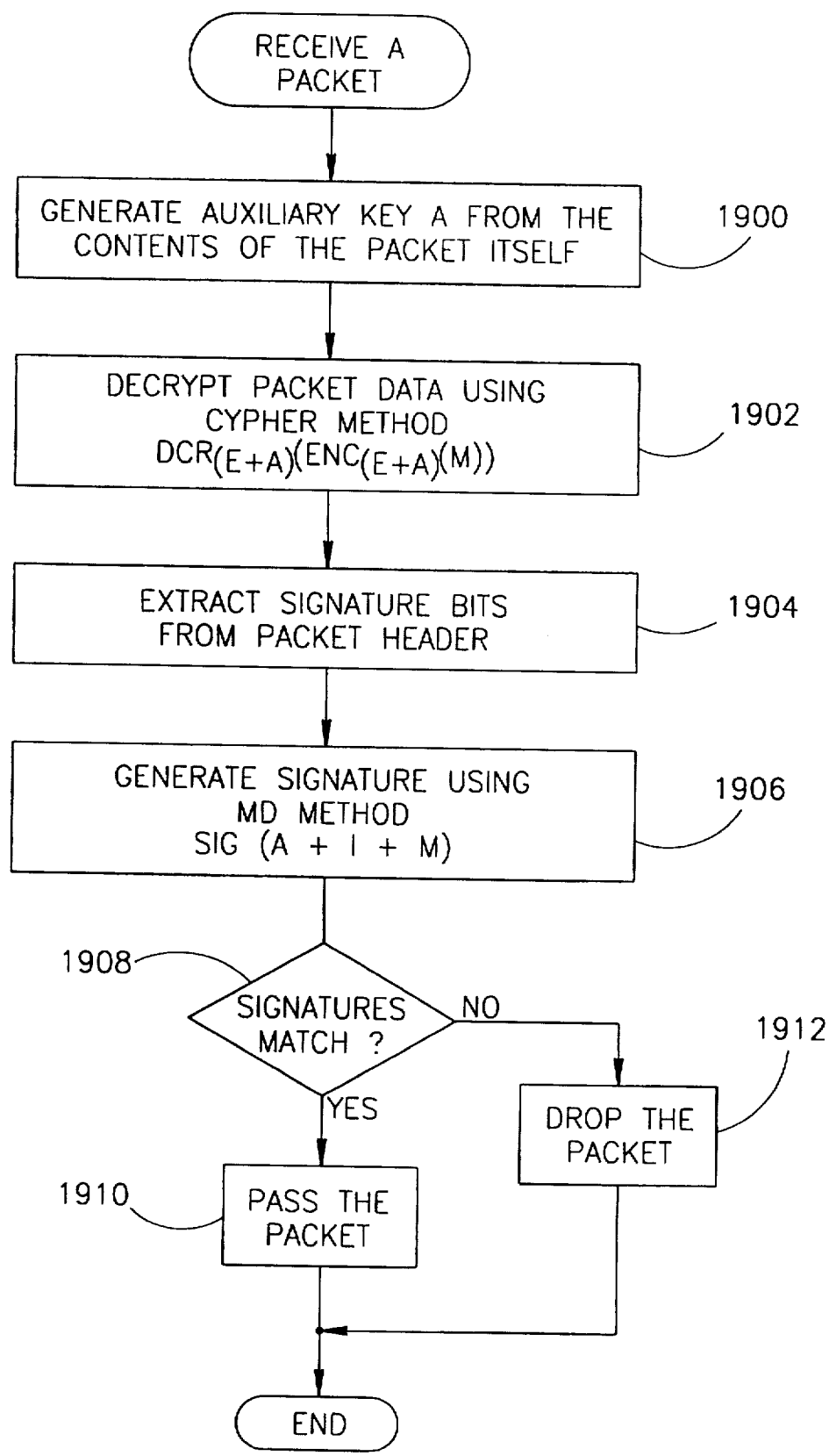
FIG. 19 is a high level logic flow diagram illustrating the process performed by a firewall in receiving an encrypted packet from another firewall during a session data exchange.

A high level logic flow diagram illustrating the process performed by a firewall in receiving an encrypted packet from another firewall during a session data exchange is shown in FIG. 19. First, in order to verify the signature, the auxiliary key A must be generated from the contents of the packet (step 1900). Then, the packet's data portion M is decrypted using the cipher method and a combination of the session data encryption key E and the auxiliary key A (step 1902), which can be expressed as $$DCR_{(E+A)}(ENC_{(E+A)}(M))$$

Next, the signature bits are extracted from the packet header (step 1904). A signature on the auxiliary key A, session data integrity key I and the packet data M is then generated using the md method (step 1906), and expressed as $$SIG(A+I+M)$$

Then the two signatures are compared with each other (step 1908). If they match the packet is passed after replacing any data in the packet that was overwritten with signature data (step 1910). If the signatures do not match the packet is dropped (step 1912).

Basic Key Exchange

As explained previously, in order to encrypt communications between firewalled network objects, a firewall must have knowledge of its own private basic key and the public basic keys of each firewall it needs to communicate with. The public basic keys belonging to external firewalls such as a firewall belonging to a business partner must also be known in order for encrypted sessions to occur. This static binding of basic keys to firewalls can already be established in a database internal to the firewall or it can be obtained on the fly using the basic key exchange. In addition, the basic keys may be updated on an infrequent basis to improve security. The present invention provides for basic public keys to be obtained on the fly if they are not already in a database within the firewall. In general, a basic public key must be obtained if the source does not have knowledge of the destination's basic public key or the destination determines that the destination basic public key used by the source is out of date.

In either case, the exchange of the basic public key is certified in order to be sure as to the authenticity of the Diffie-Hellman key being transmitted. Certification of messages, in general, serve to thwart man in the middle attacks against the system.

Figure 20:
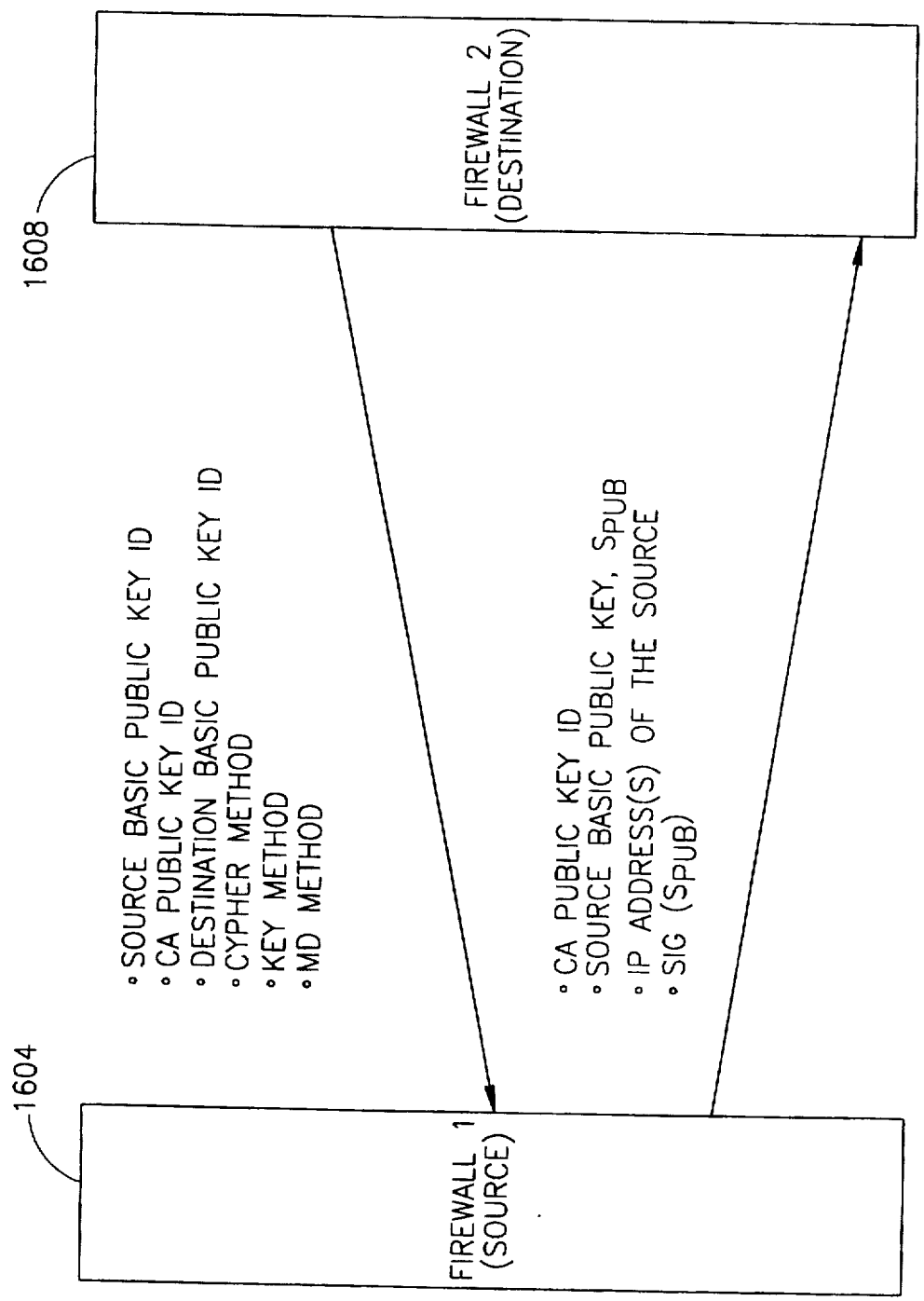
FIG. 20 is a high level block diagram illustrating the data transferred between two firewalls during a basic key exchange.

The process of exchanging the basic keys will now be described in more detail. A high level block diagram illustrating the data transferred between two firewalls during a basic key exchange is shown in FIG. 20. Whenever any of the two sides recognizes that either it does not have a valid key for its peer or that it has an outdated key it requests the other side to send it a certified basic key.

The basic key exchange can be triggered in two ways depending on which side discovers that the basic public key has to be updated or exchanged. Typically, it will be the side that discovers it does not have the other sides' basic key. For example, referring to FIG. 16, a basic key exchange will be triggered if the initiating side i.e., firewall1, discovers that it does not have the basic public key for firewall2. In another scenario, firewall2, upon receiving a request from firewall1, sees that it has an outdated version of the basic public key for firewall1 (by comparing what is in its database to the suggested basic public key sent in the request). The latter scenario is the one depicted in FIG. 20.

The elements of the basic key request are shown above the left arrow in FIG. 20. The basic request comprises the source basic public key ID, destination basic public key ID, cipher method, key method and md method. These elements are identical to those discussed above in the section entitled Session Key Exchange—Firewall/Firewall. When a basic key exchange must occur, the side that wants the other to send it a certified key update or key sync will add a CA public key ID field to the request. This new field indicates which key requires updating and is the ID of the certificate authority key (e.g., RSA key) by which firewall2 wants to receive the reply from firewall1. Upon receiving this message, firewall1 will send its basic public key $S_{pub}$ to firewall2 after certifying it with the CA public key against a certification that was made by the CA. Certification is the process of generating a digital signature of the basic public key. For firewall1, CA1 1602 generates the CA public keys for verifying firewall1's basic public keys (FIG. 16). In order for firewall2 to verify the signature, it must obtain the CA public key from CA1, the certificate authority for firewall1.

The elements of the response by firewall1 are shown above the right arrow in FIG. 20. The elements comprise the CA public key ID, the source basic public key $S_{pub}$ and the IP address or addresses of the source. In addition, the signature of the source basic public key is sent, which can be represented by $$SIG(S_{pub})$$

In a preferred embodiment, the signature is generated by first generating an intermediate signature from the basic public key to be sent using the md method of generating digital signatures. Then, this intermediate signature is input to the RSA decrypting function to generate the signature that is finally transmitted. The IP address of the source (i.e., firewall1) is included in order to verify the binding between the firewall, i.e., firewall1, and a basic public key ($S_{pub}$).

Upon receipt of the certificate from firewall1, firewall2 can verify it using the CA public key. If it verifies correctly, firewall2 updates its database with the new basic public key of firewall1. Now, the session key exchange can be completed and session data can then to be communicated.

Note that the basic public keys are communicated between each firewall and its CA over secure communication channels. If there is more than a single CA the public key of one CA is sent in the clear to the other CA. This message is either signed using a previous value of the CA public key or the newly obtained CA public key can be verified by some other manual means, such as facsimile or telephone.

Session Key Exchange—Client/Firewall

As described earlier, there is a growing business need for external access to corporate networks. More and more employees are working physically outside the corporate LAN or WAN environment but need to connect to it. The present invention provides the capability of verifying external users of a system and providing encrypted communications between the external user or client and the host system.

Figure 21:
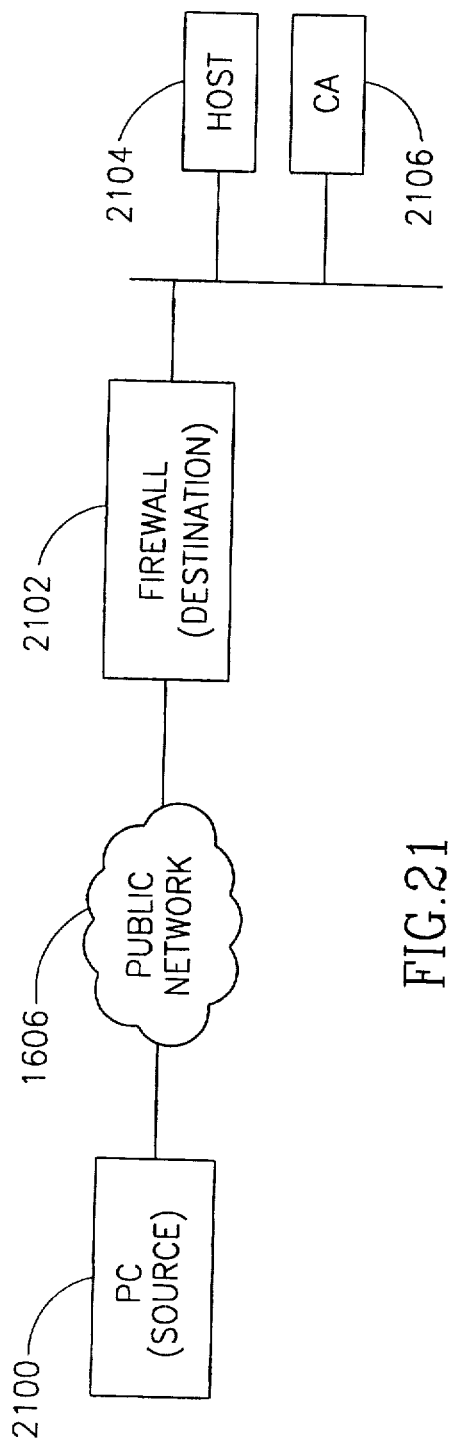
FIG. 21 is a high level block diagram illustrating an example configuration employing a client personal computer and a firewall constructed in accordance with the present invention.

A high level block diagram illustrating an example configuration employing a client personal computer and a firewall constructed in accordance with the present invention is shown in FIG. 21. A personal computer (PC) 2100, called the source for purposes of explanation, is used by the client or external user to login to the host 2104 shown coupled to a LAN. The PC is coupled to a public network 1606 and communicates with the host via firewall 2102, called the destination or server for purposes of explanation. All communications between the PC and the host is routed through the firewall. The PC is suitably programmed to perform the functions needed to login to the host and carry out encrypted communication between itself and the firewall. Similar to the configuration shown in FIG. 16, encrypted communications is only between the PC and the firewall in the configuration shown in FIG. 21. To the host, the firewall is transparent and thinks data is coming straight from the PC.

The session data exchange processes for client to firewall encryption are similar to those of firewall to firewall encryption. The differences lie, however, in the session key exchange and the basic key exchange processes. With firewall to firewall session key exchange, each session received a different session key. A session is not only a connection between two particular network objects but may include different services between the same network object. In contrast, the client initiates a session with the host and all communications between the client and the host during that session is encrypted using the same key, no matter what activities or services the client requests. In addition, in firewall to firewall communications, both sides have each other's certified public key. In client to firewall communication, this is true only for the client, while the server identifies the client using a name/password pair sent to it by the client.

Figure 22:
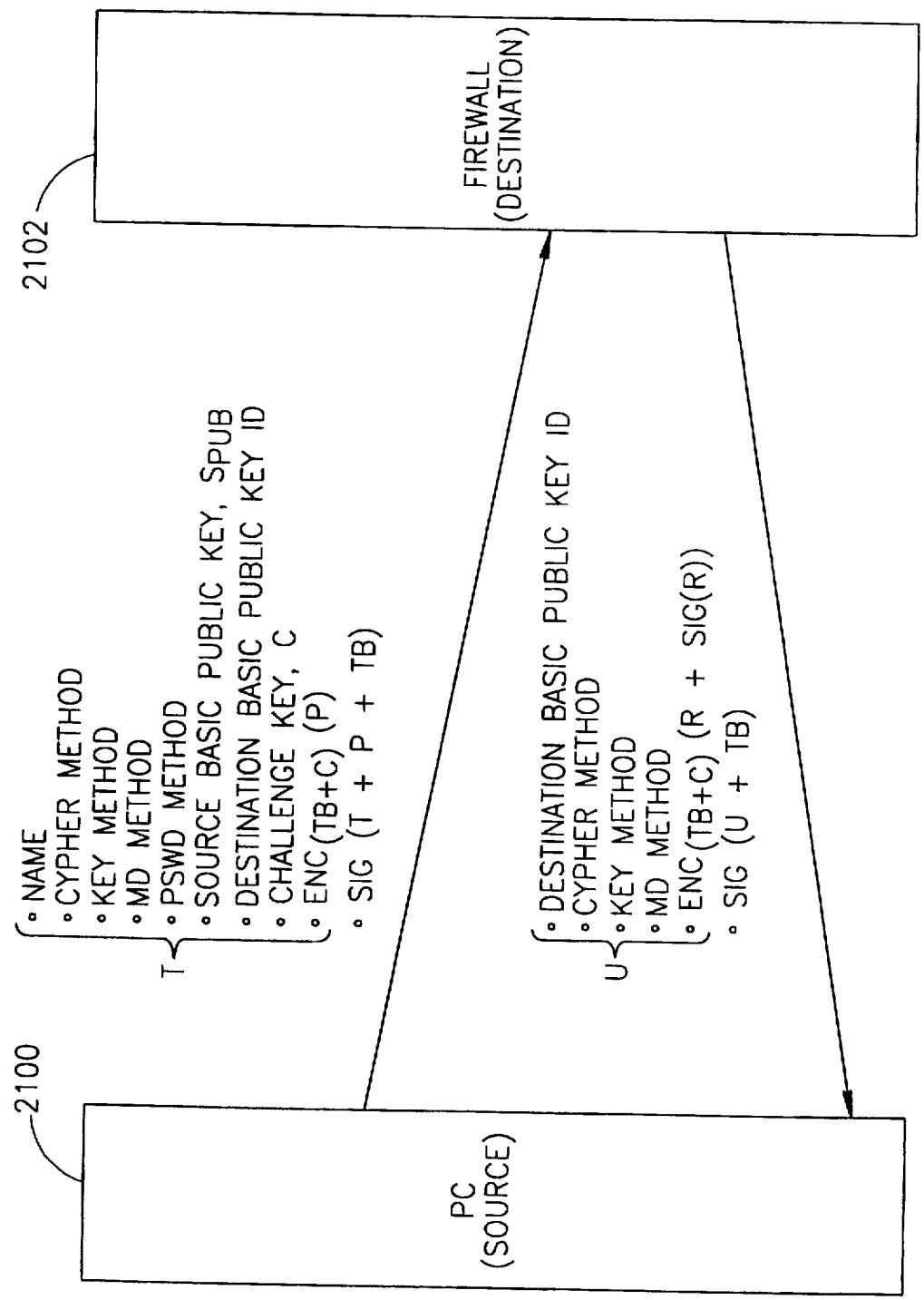
FIG. 22 is a high level block diagram illustrating the data transferred between a client personal computer and a firewall during a session key exchange.

A high level block diagram, illustrating the data transferred between a client personal computer and a firewall during a session key exchange is shown in FIG. 22. The elements sent in the request by the client are shown above the right arrow. The elements include a name, cipher method, key method, md method, password method, source basic public key $S_{pub}$, suggested destination basic public key ID, challenge key C, encrypted password and a signature. The name is used to identify the user who is currently using the client. The cipher method, key method and md method are as described earlier. The password method indicates which encryption method to use in encrypting the password. The encrypted password can be express as $$ENC_{(TB+C)}(P)$$

The source basic public key $S_{pub}$ is always sent as the firewall does not maintain a list of users and their associated basic public keys. The data that is sent is similar to the data sent by firewall1 to firewall2 (FIG. 20) as described in the section entitled Basic Key Exchange—Firewall/Firewall. The destination basic public key ID is as was described above in the section entitled Session Key Exchange—Firewall/Firewall.

The signature functions to ensure to the destination, the receiving side, that the message was not modified. The signature is generated by taking the entire contents of the request or message, represented as T in FIG. 22, except for the signature field, and combining T with the unencrypted password and the truncated basic public key TB, expressed as the following $$SIG(T+P+TB)$$

The signature is added to the request and the request then sent to the firewall.

After receipt of the request, the firewall knows the client's basic public key $S_{pub}$. It can now generate the basic key B and the truncated basic key TB. It then can decrypt the password P. Once P is known, the firewall can verify the signature in the request. The firewall next generates a random session key R and encrypts R and the signature of R using the truncated basic key TB and the challenge C sent in the request from the client, and given by $$ENC_{(TB+C)}(R+SIG(R))$$

A signature is then generated of the content of the request denoted by U in FIG. 22 in combination with the truncated basic public key TB, as given by $$SIG(U+TB)$$

The firewall then generates a reply whose elements are shown above the left arrow in FIG. 22. The reply comprises the destination basic public key ID, the cipher method, key method and md method, encrypted session key and the signature.

Once the session key is known by both the client and the firewall, the communications session can proceed between the PC and the host via the firewall and the encrypted communication between the PC and the firewall is transparent to the host. In order to reduce the number of key exchanges, the session key R is used for all encrypted connections passing through the same firewall. After a predetermined time duration, e.g., several minutes, the session key R is dropped.

Basic Key Exchange—Client/Firewall

In contrast to firewall to firewall communications, a certified key exchange is only necessary to update the client with the firewall's basic public key. A basic key exchange may be triggered in either of two ways. The first, if the client does not have the firewall's basic public key or, second, if the firewall determines that the basic public key used by the client in the request is outdated.

Figure 23:
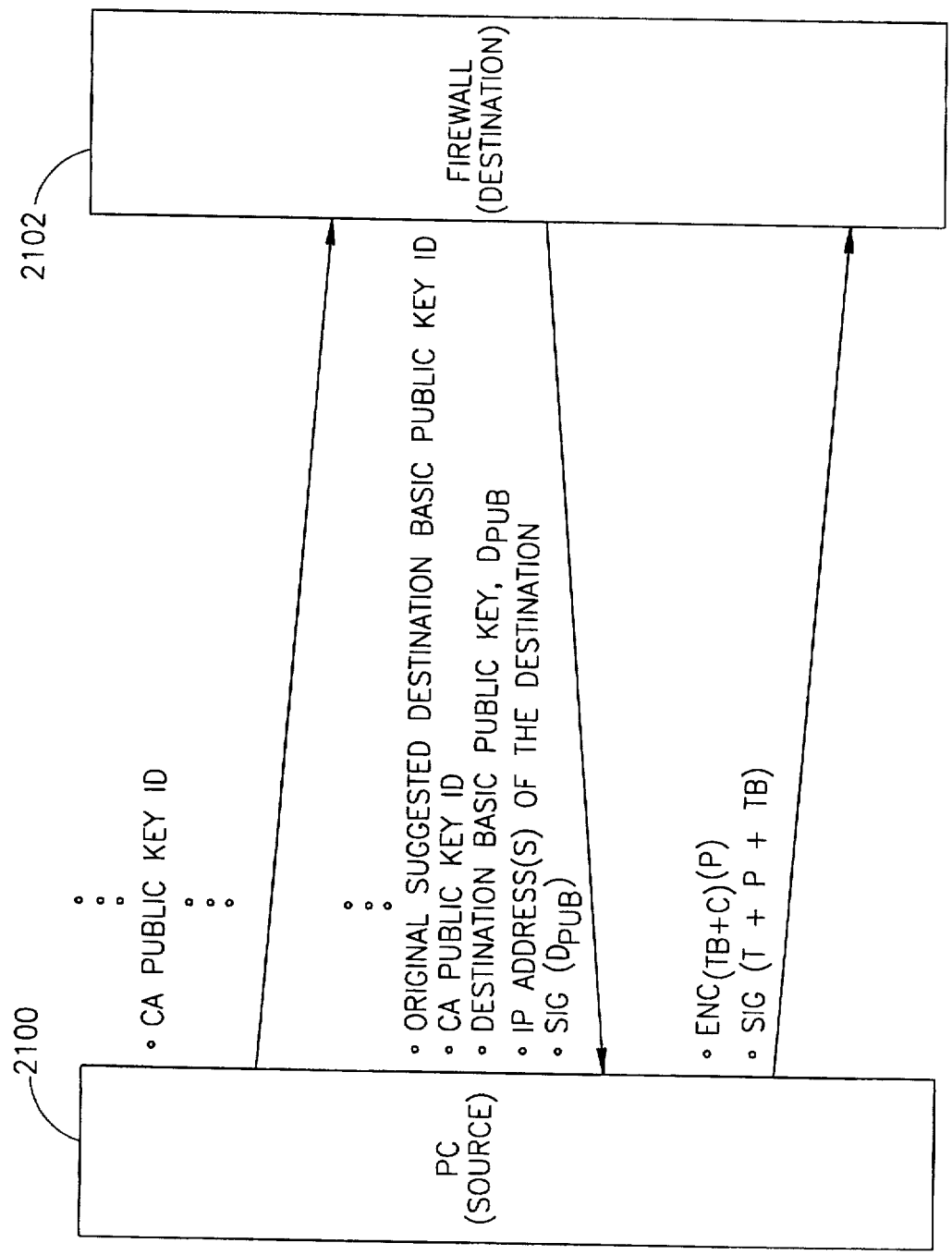
FIG. 23 is a high level block diagram illustrating the data transferred between a client personal computer and a firewall during a basic key exchange.

The process is similar to the basic key exchange as explained previously in the section entitled Basic Key Exchange—Firewall/Firewall. However, there are differences as explained below. If the client realizes that it does not have the firewall's basic public key, it substitutes a CA public key ID field for the destination basic public key ID field in the request. This is shown above the top right arrow in FIG. 23 which is a high level block diagram illustrating the data transferred between a client personal computer and a firewall during a basic key exchange. This key ID is the ID of the certificate authority key (e.g., RSA key) by which the client wants to receive the reply from the firewall.

When the firewall receives the request from the client, it determines from the request whether the client is requesting the firewall's basic public key or the key ID in the request does not correspond to the firewall's basic public key. The elements of firewall's reply is shown above the left arrow. The reply comprises the original suggested destination basic public key ID, CA public key ID, destination basic public key $D_{pub}$, IP address of the destination and a signature. The original destination basic public key is taken as is from the request. The signature of the destination basic public key is sent, which is represented by $$SIG(D_{pub})$$

In a preferred embodiment, the signature is generated by first generating an intermediate signature from the basic public key to be sent using the md method of generating digital signatures. Then, this intermediate signature is input to the RSA decrypting function to generate the signature that is finally transmitted. The IP address of the destination (i.e., the firewall) is included in order to verify the binding between the firewall, and a basic public key ($D_{pub}$).

Upon receipt of the certificate from the firewall, the client can verify it using the CA public key. If it verifies correctly, the client updates its database with the new basic public key of the firewall.

After receiving the firewall's reply, the client sends back a message to complete the authentication. The elements of the message are shown above the bottom right arrow in FIG. 23. The message comprises the password encrypted and a signature. Once the reply is received, the client can generate the basic key B and the truncated basic key TB. The client then encrypts the password P, expressed as $$ENC_{(TB+C)}(P)$$

The signature is generated using the md method on the combination of the contents of the original request sent to the firewall as shown above the right arrow in FIG. 22, represented as T, the cleartext password P and the truncated basic public key TB, as expressed as

SIG(T+P+TB)

The encrypted password and the signature are then sent to the firewall. The session key exchange then completes and session data communications can begin.

While the invention has been described with respect to a limited number of embodiments, it will be appreciated that many variations, modifications and other applications of the invention may be made.

What is claimed is:

1. A method of inspecting and selectively modifying inbound and outbound data packets in a computer network, the inspection and selective modification of said data packets occurring in accordance with a security rule, the method comprising the steps of:

generating a definition of each aspect of the computer network inspected by said security rule;

generating said security rule in terms of said aspect definitions, said security rule controlling at least one of said aspects;

converting said security rule into a set of packet filter language instructions for controlling an operation of a packet filtering module which inspects and selectively modifies said data packets in accordance with said security rule;

coupling said packet filter module to said computer network for inspecting and selectively modifying said data packets in accordance with said security rule, said packet filter module implementing a virtual packet filtering machine; and said packet filter module executing said packet filter language instructions for operating said virtual packet filtering machine to either accept or reject the passage of said data packets into and out of said network computer and selectively modify said data packets so accepted.

2. The method according to claim 1, wherein said aspects include network objects.

3. The method according to claim 1, wherein said aspects include network services.

4. The method according to claim 2, wherein said aspects include network services.

5. The method according to claim 4, wherein said object definitions include the address of said object.

6. The method according to claim 1, wherein the filter language instructions of said step of converting are in the form of script and further comprising a compiler to compile said script into said instructions executed in said step of executing.

7. The method according to claim 1, wherein in both said steps of generating said aspects of said network and of said security rule are defined graphically.

8. The method according to claim 1, wherein said selective modification is chosen from the group consisting of encryption, decryption, signature generation and signature verification.

9. In a security system for inspecting and selectively modifying inbound and outbound data packets in a computer network, said security system inspecting and selectively modifying said data packets in said computer network in accordance with a security rule, where each aspect of said computer network inspected by said security rule has been previously defined, said security rule being previously defined in terms of said aspects and converted into packet filter language instructions, a method for operating said security system comprising the steps of:

providing a packet filter module coupled to said computer network in at least one entity of said computer network to be inspected by said security rule, said packet filter module implementing a virtual packet filtering machine inspecting and selectively modifying said data packets passing into and out of said computer network; and said packet filter module executing said packet filter language instructions for operating said virtual packet filtering machine to either accept or reject the passage of said data packets into and out of said computer network and to selectively modify said data packets so accepted.

10. The method according to claim 9 wherein said aspects include network objects.

11. The method according to claim 9 wherein said aspects include network services.

12. The method according to claim 10 wherein said aspects include network services.

13. The method according to claim 12 wherein said object definitions include the address of said object.

14. The method according to claim 9 wherein said virtual machine performs a data extraction operation.

15. The method according to claim 14 wherein said virtual machine performs a logical operation.

16. The method according to claim 15 wherein said virtual machine performs a comparison operation.

17. The method according to claim 9, wherein said selective modification is chosen from the group consisting of encryption, decryption, signature generation and signature verification.

18. In a security system for inspecting and selectively modifying inbound and outbound data packets in a computer network, said security system inspecting and selectively modifying said data packets in said computer network in accordance with a security rule, where each aspect of said computer network inspected by said security rule has been previously defined, said security rule being previously defined in terms of said aspects and converted into packet filter language instructions, a method for operating said security system comprising the steps of:

providing a packet filter module coupled to said computer network in at least one entity of said computer network to be controlled by said security rule, said packet filter module emulating a virtual packet filtering machine inspecting and selectively modifying said data packets passing into and out of said computer network;

said packet filter module reading and executing said packet filter language instructions for performing packet filtering operations;

storing the results obtained in said step of reading and executing said packet filter language instructions in a storage device; and said packet filter module utilizing said stored results, from previous inspections, for operating said packet filter module to accept or reject the passage of said data packets into and out of said computer network and to selectively modify said data packets so accepted.

19. The method according to claim 18 wherein said aspects include network objects.

20. The method according to claim 18 wherein said aspects include network services.

21. The method according to claim 19 wherein said aspects include network services.

22. The method according to claim 21 wherein said object definitions include the address of said object.

23. The method according to claim 18, wherein said selective modification is chosen from the group consisting of encryption, decryption, signature generation and signature verification.

24. In a security system for inspecting and selectively modifying inbound and outbound data packets in a computer network, said security system inspecting and selectively modifying said data packets passing through said computer network in accordance with a security rule, where each aspect of said computer network controlled by said security rule has been previously defined, said security rule being previously defined in terms of said aspects and converted into packet filter language instructions, said security system comprising:

a packet filter module coupled to said computer network, said packet filter module operating in accordance with said security rule, said packet filter module implementing a virtual packet filtering machine inspecting and selectively modifying said data packets passing into and out of said computer network; and processing means for reading and executing said packet filter language instruction integral with said packet filter module, said processing means operating said packet filtering module to either accept or reject the passage of said packets into and out of said computer network and to selectively modify said data packets so accepted.

25. The method according to claim 24, wherein said selective modification is chosen from the group consisting of encryption, decryption, signature generation and signature verification.

* * * * *